United States Patent
Chun et al.

(10) Patent No.: US 7,376,094 B2
(45) Date of Patent: May 20, 2008

(54) PATTERN FORMING METHOD AND DEVICE FOR AN ADAPTIVE ANTENNA ARRAY OF A BASE STATION

(75) Inventors: Byung-Jin Chun, Suwon-shi (KR); Alexandr V. Garmonov, Voronezh (RU); Vladimir B. Manelis, Voronezh (RU); Andrew Yu Savinkov, Voronezh (RU); Alexandr I. Sergienko, Voronezh (RU); Vitaly D. Tabatsky, Voronezh (RU); Soon-Young Yoon, Kyonggi-do (KR)

(73) Assignee: Samsung Electronic Co., Ltd. (KR)

( * ) Notice: Subject to any disclaimer, the term of this patent is extended or adjusted under 35 U.S.C. 154(b) by 1008 days.

(21) Appl. No.: 10/361,650

(22) Filed: Feb. 10, 2003

(65) Prior Publication Data

US 2003/0152099 A1     Aug. 14, 2003

(30) Foreign Application Priority Data

Feb. 8, 2002    (RU) .............................. 2002103215

(51) Int. Cl.
*H04L 5/14*    (2006.01)
(52) U.S. Cl. ..................................................... 370/295
(58) Field of Classification Search ..................... None
See application file for complete search history.

(56) References Cited

U.S. PATENT DOCUMENTS

| | | | |
|---|---|---|---|
| 5,828,658 A | 10/1998 | Ottersten et al. | |
| 6,031,877 A | 2/2000 | Saunders | |
| 6,108,565 A | 8/2000 | Scherzer | |
| 6,122,260 A | 9/2000 | Liu et al. | |
| 6,317,611 B1 * | 11/2001 | Kobayakawa | ............... 455/561 |
| 6,347,234 B1 * | 2/2002 | Scherzer | .................. 455/562.1 |

(Continued)

FOREIGN PATENT DOCUMENTS

WO    WO 01/91325    11/2001

OTHER PUBLICATIONS

Naguib et al., "Capacity improvement with base-station antenna arrays in cellular CDMA", IEEE Transactions on Vehicular Technology, vol. 43, No., Aug. 1994, pp. 691-698.

(Continued)

*Primary Examiner*—Huy D. Vu
*Assistant Examiner*—Phuongchau B Nguyen
(74) *Attorney, Agent, or Firm*—The Farrell Law Firm, PC

(57) ABSTRACT

Based on a selected criterion, a BTS (Base Transceiver Station) for each mobile station (MS) determines an antenna pattern in a reverse channel, based on combined weight factors in weighed combining of signals from antenna array elements during MS signal receiving, and in the forward channel, based on combined weight factors in weighed combining of signals from antenna array elements during MS signal transmission. The antenna pattern determined in the forward channel is performed by the reverse channel signal. The antenna pattern determined in the forward channel is based on the estimate of the angle signal area of mobiles station that is the average angle of signal arrival and its angle sector or on the estimate of average angle of signal arrival only. To determine the desired signal angular area, a decision function is proposed, where powerful interference canceling is implemented.

18 Claims, 12 Drawing Sheets

U.S. PATENT DOCUMENTS

| | | | |
|---|---|---|---|
| 6,483,459 B1 * | 11/2002 | Hou et al. | 342/378 |
| 6,493,379 B1 * | 12/2002 | Tanaka et al. | 375/150 |
| 6,888,501 B2 * | 5/2005 | Hirayama et al. | 342/377 |
| 2002/0061051 A1 * | 5/2002 | Kitahara | 375/144 |
| 2002/0167444 A1 * | 11/2002 | Lee | 342/387 |
| 2002/0183095 A1 * | 12/2002 | Aoyama et al. | 455/561 |
| 2003/0048760 A1 * | 3/2003 | Park et al. | 370/295 |
| 2003/0114194 A1 * | 6/2003 | Hiramatsu | 455/562 |
| 2004/0204098 A1 * | 10/2004 | Owen | 455/561 |
| 2005/0053123 A1 * | 3/2005 | Higuchi et al. | 375/148 |

OTHER PUBLICATIONS

Horn et al., "Matrix Analysis", pp. 119-165. (1985).

Liberti, Jr. et al., "Smart Antennas for Wireless Communications: IS-95 and Third Generation CDMA Applications", pp. 81-116. (1999).

* cited by examiner

PATTERN FORMING METHOD AND DEVICE FOR AN ADAPTIVE ANTENNA ARRAY OF A BASE STATION

PRIORITY

This application claims priority to an application entitled "PATTERN FORMING METHOD AND DEVICE FOR AN ADAPTIVE ANTENNA ARRAY OF A BASE STATION", filed in the Russian Federal Institute of Industrial Property on Feb. 8, 2002, and assigned Serial No. 2002103215, the contents of which are incorporated herein by reference.

BACKGROUND OF THE INVENTION

1. Field of the Invention

The invention relates generally to radio engineering, and particularly, to methods of radio signal reception and transmission using adaptive antenna arrays in CDMA (Code Division Multiple Access) cellular communications systems. Also, the present invention can be applied to BTS (Base Transceiver Station) receiving devices that form an antenna pattern for each mobile user in both the reverse and forward channels.

2. Description of the Related Art

The use of an adaptive antenna array in CDMA BTS considerably improves communication quality and system capacity, and expands a BTS coverage area. Consequently, all third generation (3G) standards require use of the adaptive antenna array in a BTS.

The following conventional approaches to form an antenna pattern of a smart antenna in the forward channel are known in the art.

According to a first approach, a weight vector of antenna array elements obtained while receiving a signal in a reverse channel is used for signal transmission in a forward channel. This approach is described in Joseph C. Liberti, Theodore S. Rappaport, "Smart Antennas for Wireless Communication", Prentice Hall PTR, 1999, and in U.S. Pat. No. 6,031,877 to Simon Saunders, entitled "Apparatus and Method for Adaptive Beam forming in an Antenna Array" granted Feb. 29, 2000; and U.S. Pat. No. 6,122,260 to Hui Liu, Guanghan Xu entitled "Smart Antenna CDMA Wireless Communication System" granted Sep. 19, 2000. The contents of all of the above referenced documents are incorporated herein by reference. This approach is most efficient in TDD (Time Division Duplexing) communication systems.

In TDD systems, the forward and reverse channels are time divided and matched in the carrier frequency. Therefore the direction of the signal traveling from the mobile station (MS) to base station (BS), which is determined by an MS signal, matches a direction of the signal traveling from the BS to the MS. However, for FDD (Frequency Division Duplexing) CDMA systems, the applicability of this method is hardly possible because changes in the carrier frequency might result in considerably different multipath characteristics in the forward and reverse channels.

According to a second approach based on a training signal, an MS estimates forward channel parameters and the estimate is supplied to a BTS via a reverse channel. Based on this estimate, the BTS corrects SA (Smart Antenna) weight factors in the forward channel. This approach is described in article Ayman F. Naguib, Arogyaswami Paulrai, Thomas Kalath. "Capacity Improvement with Base-Station Antenna Arrays in Cellular CDMA", IEEE Trans. Veh. Technol, vol. 43, no. 3, pp. 691-698, August 1994, and in U.S. Pat. No. 5,828,658 to Bjorn E. Ottersten, Craig H. Barratt, David M. Parish, Richard H. Roy entitled "Spectrally Efficient High Capacity Wireless Communication Systems with Spatio-Temporal Processing" granted Oct. 27, 1998. The contents of all of the above referenced documents are incorporated herein by reference.

The disadvantages of this approach are that a substantial amount of data must be transmitted via the reverse channel to provide feedback and that a long response time of feedback is required. In addition, the use of feedback is impossible in some cellular communications systems, particularly, the 3GPP2 system.

According to a third approach, a direction of arrival of a strongest component of a mobile user multipath signal is determined (see Joseph C. Liberti, Theodore S. Rappaport, "Smart Antennas for Wireless Communication, Prentice Hall PTR", 1999, and U.S. Pat. No. 6,108,565 to Shimon B. Scherzer entitled "Practical Space-Time Radio Method for CDMA Communication Capacity Enhancement" granted Aug. 22, 2000). This direction is considered as the main direction of a signal traveling from a BTS to an MS. Complex coefficients of the antenna array elements in the forward channel are selected so that the main lobe of the forward channel antenna pattern is oriented in this direction. The width of the main lobe can be determined by an angle sector of the signal.

One possible operation of the third approach is a consequential method disclosed in U.S. Pat. No. 6,108,565. In the method of space-time signal processing a switch beam forming method is used. The width of an antenna beam lobe depends on the distance from mobile users to BTS. If mobile users are in a close vicinity of the BTS, the lobe corresponding to them becomes wider. When mobile users are far away from the BTS, the lobe corresponding to them becomes narrower. Due to the fact that this approach requires information on a distance to the mobile users due to the consequential character of angle spread estimation, it cannot have sufficient accuracy.

A pattern forming method for an adaptive antenna array is described in U.S. Pat. No. 6,108,565, and is the closest to the proposed solution in the prior art (hereinafter referred to as the "prototype").

The method of utilizing the prototype is described as follows. For each path, weight coefficients of antenna array elements are generated in order to periodically perform the following operations: first, the input signal is demodulated at antenna array elements, then fast Hadamard transformation of the demodulated input signal at the antenna array elements is performed generating the input signal matrix, the input signal matrix is multiplied by the matrix of reference signals, the estimate of the angle of arrival of the input path signal is determined by analyzing the multiplication result of the input signal matrix and matrix of reference signals, the current value of the weight vector is determined as the vector that corresponds to the estimate of the angle of arrival of the input path signal, current values of weight vectors of paths are output and used to determine a pattern of the adaptive antenna array, and the matrix of reference signals is determined by the signals that correspond to pre-determined discrete hypothesizes on the angle of arrival of the input signal.

The estimate of an angle of an arrival of an input signal θ determines a weight vector according to Equation 1 below:

$$w = [1, e^{-j\phi}, e^{-j2\phi}, K, e^{-j(N-1)\phi}] \quad (1)$$

where $$\phi = \frac{2\pi}{\lambda} d \sin\theta,$$

λ is a wavelength, d is a distance between antenna array elements, and N is a number of antenna array elements.

In order to implement this method the prototype (conventional) device comprising L path signal processing blocks, which is illustrated in FIG. 1, is used. As illustrated in FIG. 1, the device comprises L path signal processing blocks. Each of L path signal processing blocks contains N parallel channels, consisting of successively connected correlators 2 and fast Hadamrd transformers 3. Also, the device consists of a reference signal generator 1, matrix multiplier and analyzer 4, weight vector of reverse channel antenna array generator 5, and weight vector of forward channel antenna array generator 6.

First inputs of correlators 2.1-2.N are signal inputs and also inputs of the device. The second inputs are reference inputs and combine with the output of reference signal generator 1. The output of each fast Hadamar transformer 3.1-3.N is connected to the corresponding inputs of matrix multiplier and analyzer 4, the output of which is supplied as the input of weight vector of reverse channel antenna array generator 5. A first output of weight vector of reverse channel antenna array generator 5 is the output of the current weight vector of the reverse channel and the first output of the path signal processing block of the device. A second output of weight vector of reverse channel antenna array generator 5 is supplied as the input of weight vector of forward channel antenna array generator 6. The output of weight vector of forward channel antenna array generator 6 is the output of the current weight vector in the forward channel and second output of the path signal processing block of the device.

The prototype (conventional) device illustrated in FIG. 1 operates in the following maimer.

According to the description above of the prototype, in each of L path signal processing blocks, a complex input signal is fed to first (signal) inputs of correlators 2.1-2.N. A reference PN sequence is supplied from reference signal generator 1 to second (reference) inputs of correlators 2.1-2.N. The state of reference signal generator 1 corresponds to the value of the time position of the path signal in the multipath signal to be received. Complex demodulated signals supplied from outputs of correlators 2.1-2.N are fed to inputs of the corresponding fast Hadamard transformers 3.1-3.N, where Hadamard basis decomposition of the input signal is performed. Spectrums of inputs signals supplied from outputs of fast Hadamard transformers 3.1-3.N are supplied to N inputs of matrix multiplier and analyzer 4. In block 4, the matrix of reference signals multiplies the input signal matrix. The inputs signal matrix is generated by the spectrums of input signals. The matrix of reference signals is determined by signals that correspond to predetermined discrete hypothesizes on the angle of arrival of the input path signal.

In addition, in the matrix multiplier and analyzer 4 the multiplication result of the input signal matrix and matrix of reference signals is analyzed and the estimate of the angle of arrival of the input path signal is determined. The estimate of the angle of arrival of the input path signal supplied from the output of the matrix multiplier and analyzer 4 is applied to the input of weight vector of reverse channel antenna array generator 5. Weight vector of reverse channel antenna array generator 5 generates the current weight vector of the reverse channel path at its first output based on the estimate of the angle of arrival of the input path signal. This weight vector is the first output signal of the device.

The estimate of the angle of arrival of the input path signal supplied from the output of weight vector of reverse channel antenna array generator 5 is fed to the input of weight vector of forward channel antenna array generator 6. Weight vector of forward channel antenna array generator 6 generates the current weight vector of the forward channel path at its output based on the estimate of the angle of arrival of the input path signal. This weight vector is the second output signal of the device.

The width of the antenna beam lobe in the forward channel depends on the distance from mobile users to the BTS. If mobile users are in the close vicinity of the BTS, the lobe corresponding to them becomes wider. When mobile users are far away from the BTS, the lobe corresponding to them becomes narrower.

This approach requires determining the distance to mobile users due to the consequential character of angle spread estimation and therefore does not have sufficient accuracy.

Further drawbacks of this method are that in the presence of strong interferences from other users (high rate users, i.e., users with high data transmission rate) the desired signal can be cancelled by the interference and the correct solution about the direction of arrival and angular area of the desired signal cannot be determined.

SUMMARY OF THE INVENTION

Therefore, the present invention has been designed in view of the above problems, and it is an object of the present invention to improve the interference canceling efficiency in the complex interference-signal environment in the presence of powerful interferences with arbitrary values of the desired signal, and interference angle sector including great ones.

Two embodiments of the pattern forming method and device for a BTS adaptive antenna array are described herein below. The first embodiment of the antenna pattern forming method is applied to random values of user signals' angle spread, and in the second embodiment, a method is applied to relatively small (e.g., less than 30 degrees) values of user signals' angle spread.

The first embodiment of the pattern forming method for a BTS adaptive antenna array in which the common pilot signal is transmitted from one of the antenna array elements and an information signal is transmitted to each subscriber from all antenna array elements, and during reception of the subscriber signal the complex correlation responses of the pilot signal of antenna array elements are generated, the complex weight coefficients of antenna array elements in the reverse channel are generated, for each of L different directions of the researched angular area the decision function is generated, the direction of the decision function maximum is determined, the estimate of the average angle of arrival of the signal is generated, taking into account the geometry of the antenna array the phase coefficients of antenna array elements are determined using the generated estimate of the average angle of arrival of the signal. Before the generation of complex correlation responses of the pilot signal of antenna array elements for each subscriber, the search for the subscriber signal is performed to determine time positions of path signals, a path the signal of which has the maximum power is selected, the sequence of estimates of angle of signal arrival is generated, estimate of the angle of arrival of the signal after generation of complex correlation responses of the pilot signal of antenna array elements is generated, for each of L different directions of the researched angular area the complex correlation responses of the pilot signal are generated at the output of the antenna array combined products of complex correlation responses of the pilot signal of antenna array elements and corresponding complex coefficients of each direction, modules of complex correlation responses of the pilot signal are generated at the output of the antenna array for L different directions and the maximum module is determined, and normalized modules of complex correlation responses of the pilot signal are generated at the output of the antenna array for L different directions determining ratios of modules of complex correlation responses of the pilot signal at the output of the antenna array for L different directions and the maximum module.

After generation of complex weight coefficients of the antenna array in the reverse channel for each of L different directions of the considered angular area the values of the antenna pattern in the reverse channel are generated, the maximum generated value of the antenna pattern in the reverse channel is determined, normalized values of the antenna pattern in the reverse channel are generated for L different directions determining ratios of values of the antenna pattern and the maximum value, and the decision function for each of L different directions of the researched angular area is generated performing the weighed combining of the normalized module of the complex correlation response of the pilot signal at the output of the antenna array and the normalized value of the antenna pattern in the reverse channel.

While determining the direction of the decision function maximum, the estimate of the angle of signal arrival is obtained as a direction of the decision function maximum, the sequence of generated estimates of the angle of arrival of the signal is grouped in blocks, each having M estimates of the angle of signal arrival, and the sequence of estimate distribution vectors of angle of signal arrival of blocks is generated. In this case for each block the estimate distribution vector of angle of signal arrival of block of L length is generated by M generated estimates of angle of signal arrival of the block; each element of this vector corresponds to one of L directions of the researched angle area and is equal to the number of estimates of angle of signal arrival of the given direction, and the sequence of averaged estimate distribution vectors of angle of signal arrival is generated based on the sequence of estimate distribution vectors of angle of arrival of the signal of blocks using the sliding window.

For each averaged estimate distribution vector of angle of signal arrival estimates of the top and bottom boundaries of the angle signal area are determined, and estimate of the average angle of arrival is generated by obtained estimates of the top and bottom boundaries of the angle signal area.

After determination of phase coefficients of antenna array elements, the correlation matrix of signals of antenna array elements is generated based on the obtained estimates of the top and bottom boundaries of the angle signal area, Cholesky transformation of the generated correlation matrix is performed obtaining the bottom triangular matrix, ratio of amplitude coefficients of antenna array elements and the amplitude coefficient of the antenna array element is determined, the pilot signal is transmitted from this antenna array element using the obtained bottom triangular matrix and phase coefficients of antenna array elements, the normalized coefficient is determined by the obtained ratio taking into account the number of antenna array elements, amplitude coefficients of antenna array elements are determined by multiplying the normalized coefficient by the ratio of amplitude coefficients of antenna array elements and the amplitude coefficient of the antenna array element from which the pilot signal is transmitted, and generated amplitude and phase coefficients of antenna array elements are used to transmit the information signal to the subscriber.

The estimate of the bottom and top boundaries of the angle signal area is performed, for example, in the following manner: the maximum element of the averaged estimate distribution vector of angle of arrival of the signal is determined, the bottom and top elements are determined as boundaries of the group of elements of the averaged estimate distribution vector of angle of signal arrival; in this case this group of elements comprises the maximum element of the averaged estimate distribution vector of angle of signal arrival and elements of the group exceed the threshold, however, in either of the directions of the maximum element a single non-exceeding of the threshold as well as a group one, two of three elements placed near one another, are allowed, the sum of elements of the averaged estimate distribution vector of angle of signal arrival that are located below the bottom element is determined and the sum of elements of the averaged estimate distribution vector of angle of signal arrival that are located above the top element is also determined, the correcting amendment is generated for the bottom element, this amendment depends on the sum of elements of the averaged estimate distribution vector of angle of signal arrival that are located below the bottom element and the correcting amendment is generated for the top element, this amendment depends on the sum of elements of the averaged estimate distribution vector of angle of signal arrival that are located above the top element, the correction value is determined both for the bottom and top elements, the value being dependent on the position of the maximum element of the averaged estimate distribution vector of angle of signal arrival, the estimate of the bottom boundary of the angle signal area is determined as a difference of the angle coordinate corresponding to the bottom element, and the sum of the correcting amendment is determined for the bottom element and the correction value, and the estimate of the top boundary of the angle signal area is determined as a sum of the angle coordinate corresponding to the top element, correcting amendment for the top element and correction value.

The estimate of the average angle of signal arrival can be generated as a half-sum of estimates of the bottom and top boundaries of the angle signal area.

The ratios of amplitude coefficients of antenna array elements and the amplitude coefficient of the antenna array element from which the pilot signal is transmitted can be equal to each other. This ratio is determined as the maximum value within the interval from 0 to 1 for which the ratio of average powers of the statistically coherent and statistically non-coherent components of the model of the information signal received by the subscriber does not exceed the given value.

The second embodiment of the forward channel pattern forming method for BTS adaptive antenna array consists of receiving the subscriber signal while the complex correlation responses of the pilot signal of antenna array elements are generated, the complex weight coefficients of adaptive antenna array elements in the reverse channel are generated, for each of L different directions of the researched angular area the decision function is generated, the direction of the decision function maximum is determined generating the estimate of the average angle of signal arrival, and taking into account the geometry of the antenna array the phase coefficients of antenna array elements are determined using the generated estimate of the average angle of arrival of the signal.

Before generation of complex correlation responses of the pilot signal of antenna array elements for each subscriber, the search for the subscriber signal is performed determining time positions of path signals, a path the signal of which has the maximum power is selected, and the estimate of the average angle of arrival of the subscriber signal is generated periodically. After generation of complex correlation responses of the pilot signal of antenna array elements in the reverse channel, for each of L different directions of the researched angular area the complex correlation responses of the pilot signal are generated at the output of the antenna array combining products of complex correlation responses of the pilot signal of antenna array elements and corresponding complex coefficients of each direction, modules of the complex correlation responses of the pilot signal are generated at the output of the antenna array for L different directions, the summed correlation response of the pilot signal is generated at the output of the antenna array combining the modules of complex correlation responses of the pilot signal at the output of the antenna array for L different directions and the maximum of the modules is determined, and the normalized summed correlation responses of the pilot signal are generated at the output of the antenna array for L different directions determining the ratios of the summed correlation responses of the pilot signal at the output of the antenna array for L different directions to the maximum summed correlation response.

After generation of complex weight coefficients of antenna array elements in the reverse channel, for each of L different directions of the researched angular area the values of the antenna pattern are generated in the reverse channel, the maximum generated value of the antenna pattern is, determined in the reverse channel, normalized values of the antenna pattern are generated in the reverse channel for L different directions determining the ratio of values of the antenna array and the maximum value, and the decision function for each of L different directions of the researched angular area is generated performing the weighed combining of the normalized summed correlation response of the pilot signal at the output of the antenna array and normalized value of the antenna array in the reverse channel. After generation of the average angle of signal arrival and phase coefficients of antenna array elements, amplitude coefficients of antenna array elements are set equal to each other, amplitude and phase coefficients of antenna array elements are used to transmit a signal to the subscriber.

While combining the modules of complex correlation responses of the pilot signal at the output of the antenna array for L different directions the number of components is either set constant or selected adaptively depending on the estimate of the signal fading frequency.

In order to solve the problem the first embodiment of the forward channel pattern forming device for BTS adaptive antenna array comprising N correlators, the reference signal generator, the angle of signal arrival estimator, the weight vector of antenna array in the reverse channel generator, and the weight vector of antenna array in the forward channel generator, where first inputs of correlators are signal inputs and connected to the inputs of the device, second inputs of correlators are reference inputs and joint with the output of the reference signal generator.

L blocks of calculation of decision function for different directions, each containing N−1 multipliers, the first combiner, module calculator, block of complex direction coefficients, and discrete values of antenna pattern in the reverse channel calculator. The following blocks are also added: the search block, controller, first and second normalization blocks, second combiner, scaling block, estimate distribution vector of angle of signal arrival generator, averaged estimate distribution vector of angle of signal arrival generator, averaged estimate distribution vector of angle of signal arrival analyzer, where the first input of the search block is connected to the first input of the device, the second input of the search block is the control and connected to the output of the device, the output of the search block is the output of the search decision function and connected to the input of the controller, the input of the reference signal generator is the control and connected to the output of the controller, providing the synchronous operation of blocks of the device, first inputs of N−1 multipliers and the first input of first combiner is first inputs of the decision function of direction calculator and are connected to the outputs of the corresponding correlators.

Generating the correlation responses of the pilot signal of antenna array elements at these outputs, the outputs of the multipliers are connected to the inputs of first combiner, from the second one to N-th, the output of first combiner is the output of the complex correlation response of the pilot signal of the given direction at the output of the antenna array and is connected to the input of the module calculation block, and the first output of each decision function of direction calculator and is connected to the corresponding input of first normalization block, the first input of the discrete values of antenna array in the reverse channel calculator is the second input of each decision function of direction calculator and is connected to the output of the weight vector of antenna array in the reverse channel generator generating the weight coefficients of antenna array elements in the reverse channel, signal inputs of the weight vector of antenna array in the reverse channel generator is connected to the inputs of the device, the second input of the block of calculation of discrete values of antenna pattern in the reverse channel and second inputs of N−1 multipliers are combined and connected to the outputs of the complex direction coefficients which outputs complex coefficients of the given direction, the output of the block of calculation of discrete values of antenna pattern in the reverse channel which is the second output of the block of calculation of decision function of direction and the output of the value of the antenna array pattern in the reverse channel of the given direction is connected to the corresponding input of second normalization block.

The output of first normalization block which is the output of the normalized modules of complex correlation responses of the pilot signal at the output of the antenna array of all L directions is connected to the first input of second combiner, the output of second normalization block is the output of normalized values of antenna array pattern in the reverse channel of all L directions and is joint with the input of the scaling block, the output of the scaling block is the output of weighed normalized values of antenna array pattern in the reverse channel for L directions and is joint with the second input of second combiner, the output of second combiner is the output of values of the decision function for L directions and is connected to the input of the angle of signal arrival estimator, the output of which is the output of the estimate of the average angle of signal arrival is connected to the input of the estimate distribution vector of angle of signal arrival generator, at the output generating the sequence of estimate distribution vectors of angle of signal arrival, the output of the estimate distribution vector of angle of signal arrival generator is connected to the first input of averaged estimate distribution vector of angle of signal arrival generator, the second input of which is the control and is connected to the output of the controller, the output of the averaged estimate distribution vector of angle of signal arrival generator is the output of the sequence of averaged estimate distribution vectors of angle of signal arrival and is connected to the input of the estimate distribution vector of angle of signal arrival analyzer generate the estimates of the top and bottom boundaries of the angle signal area, the outputs of the estimate distribution vector of angle of signal arrival analyzer are connected to the corresponding inputs of the weight vector of antenna array pattern in the forward channel generator, the outputs of the weight vector of antenna array pattern in the forward channel generator are the outputs of amplitude and phase coefficients of antenna array elements.

In order to solve the given problems the second embodiment of the forward channel pattern forming device for BTS adaptive antenna array comprising N correlators, the reference signal generator, angle of signal arrival estimator, weight vector of antenna array in the reverse channel generator, and weight vector of antenna array in the forward channel generator, where first inputs of correlators are signal inputs and connected to the inputs of the device, second inputs of correlators are reference inputs and connected to the output of the reference signal generator.

L blocks of calculation of decision function for different directions, each containing N–1 multipliers, first combiner, module calculation block, reset combiner, complex direction coefficients and discrete values of antenna array pattern in the reverse channel calculator. Also included are the search block, controller, first and second normalization blocks, second combiner, scaling block, where the first input of the search block is connected to the first input of the device, the second input of the search block is the control and is connected to the output of the controller, the output of the search block is the output of the decision function of search and is connected to with the input of the controller, the input of the reference signal generator is the control and is connected to the output of the controller, providing the synchronous operation of blocks of the device.

First inputs of N–1 multipliers and the first input of first combiner are first inputs of the block of calculation decision function of direction and are connected to the outputs of the corresponding correlators generating the correlation responses of the pilot signal of antenna array elements at their outputs, the outputs of multipliers are connected to the inputs of first combiner beginning from the second one to N-th, the output of first combiner is the output of the complex correlation response of the pilot signal of the given direction at the output of the antenna array and is connected to the input of the module calculation block, the output of which is the output of the module of the complex correlation response of the pilot signal of the given direction at the output of the antenna array and is connected to the first input of the reset combiner, the second input of which is the input of the reset signal and is connected to the output of the controller, the output of the reset combiner is the output of the combined correlation response of the pilot signal of the given direction at the output of the antenna array and the first output of each of the decision function of direction calculators and is connected to the corresponding input of first normalization block, the first input of the discrete values of antenna array pattern in the reverse channel calculator is the second input of each decision function of direction calculator and is connected to the output of the weight vector of antenna array in the reverse channel generator generating the weight coefficients of antenna array elements in the reverse channel at the output of the antenna array, the signal inputs of the weight vector of antenna array in the reverse channel generator are connected to the inputs of the device, the second input of the discrete values of antenna array pattern in the reverse channel calculator and second inputs of N–1 multipliers are combined and connected to the output of the complex direction coefficients which is the output of complex coefficients of the given direction, the output of the discrete values of antenna array pattern in the reverse channel calculator which is the second output of the decision function of direction and the output of the value of the antenna array pattern in the reverse channel calculator of the given direction is connected to the corresponding input of second normalization block.

The output of first normalization block which is the output of normalized combined modules of complex correlation responses of the pilot signal at the output of the antenna array of all L directions is connected to the first input of second combiner, the output of second normalization block is the output of normalized values of the antenna array pattern in the reverse channel of all L directions and is connected to the input of the scaling block, the output of the scaling block is the output of weighed normalized values of the antenna array pattern in the reverse channel for L directions and is joint with the second input of second combiner, the output of second combiner is the output of values of decision function for L directions and is connected to the input of the angle of signal arrival estimator the output of which is the output of the estimate of average angle of signal arrival and is joint with the input of the weight vector of antenna array pattern in the forward channel generator, the outputs of the weight vector of antenna array pattern in the forward channel generator are the outputs of amplitude and phase coefficients of antenna array elements.

The comparative analysis of the first and second embodiments of the method and device of generation of base station adaptive antenna array pattern with the prototype shows that the proposed inventions differ significantly from the prototype since they improve interference canceling in complex interference-signal environment.

BRIEF DESCRIPTION OF THE DRAWINGS

The above and other features, objects, and advantages of the present invention will become more apparent from the detailed description set forth below when taken in conjunction with the drawings wherein like reference characters correspond throughout, in which.

DETAILED DESCRIPTION OF THE PREFERRED EMBODIMENTS

Figure 1:
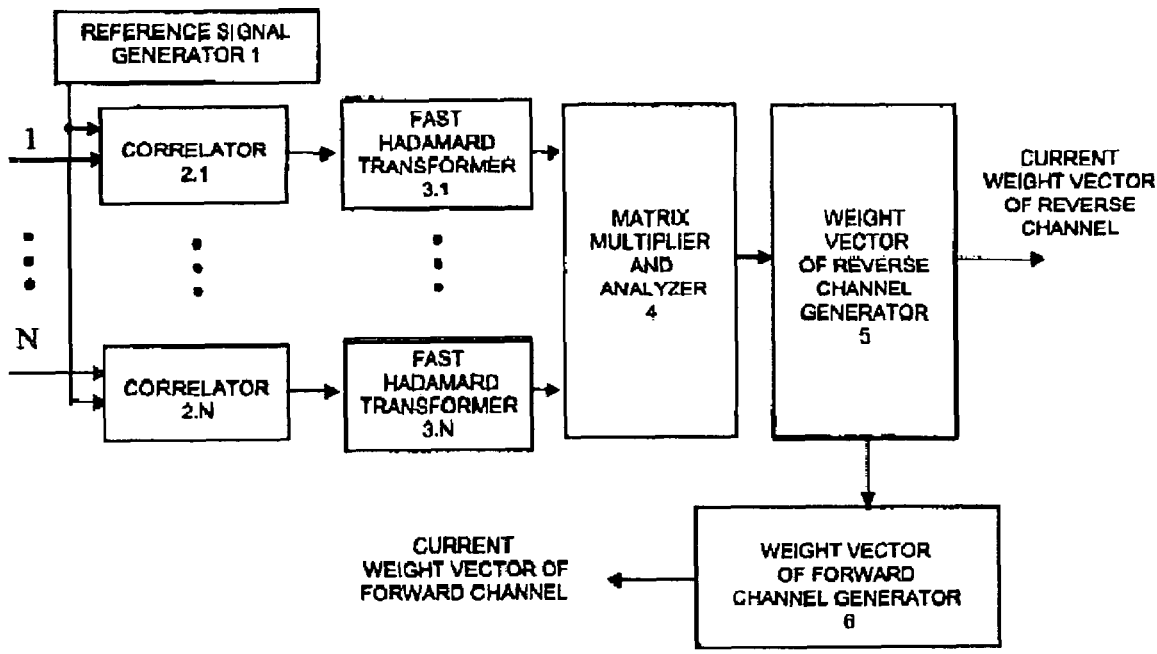
FIG. 1 is a block diagram of a conventional device.
Figure 2:
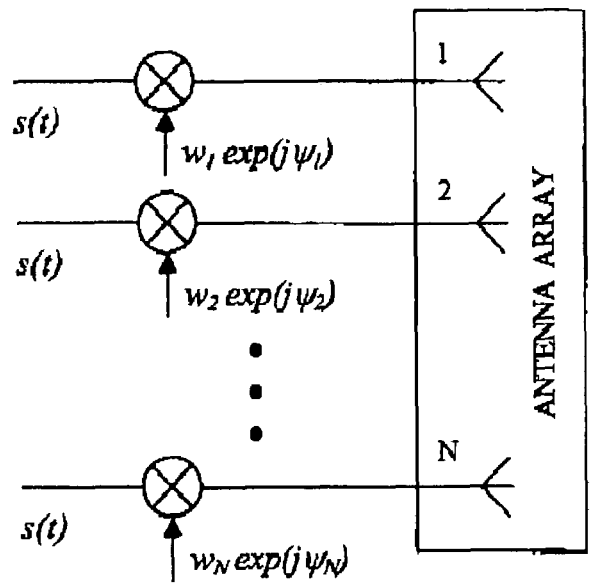
FIG. 2 illustrates an antenna array pattern forming in a forward channel.

Preferred embodiments of the present invention will be described in detail herein below with reference to the annexed drawings. In the following description, a detailed description of known functions and configurations incorporated herein will be omitted when it is not necessary to describe the subject matter of the present invention.

In the first embodiment of the present invention, a first method of antenna pattern forming of a BS adaptive antenna array, during which the common pilot signal is transmitted from one of the antenna array elements and an information signal is transmitted to each user from all the antenna array elements, will be described herein below.

For each user, the search for user signal is carried out by determining the time positions of path signals, the signal with the maximum power is selected. Next, the estimated sequence of the angle of the signal arrival is determined.

For generation of each angle of signal arrival estimate, the complex correlation pilot signal responses of the antenna array elements are formed. For each of L different directions $\theta_i$, $i=\overline{1,L}$ of the researched angular area the complex correlation pilot signal responses at the antenna array output are formed by adding the products of the complex correlation pilot signal responses of antenna array elements to corresponding complex coefficients of each direction. The modules of complex correlation pilot signal responses at the antenna array output for L different directions are formed and the maximum one is to be determined Normalized modules of complex correlation pilot signal responses at the antenna array output for L different directions are formed by determining the ratios of complex correlation pilot signal responses at the antenna array output for L different directions modules to the maximum module. The complex weight coefficients of the adaptive antenna array elements in the reverse channel are determined during user signal reception.

For each of L different directions $\theta_i$, $i=\overline{1,L}$ of the researched angular area, the value of the antenna array pattern in the reverse channel is determined. The maximum of the determined values of the antenna array pattern in the reverse channel is determined. Then normalized values of the antenna array pattern in the reverse channel for L different directions is determined by finding the ratios of the antenna array pattern in the reverse channel values to the maximum value.

For each of L different directions $\theta_i$, $i=\overline{1,L}$ of the researched angular area, the decision function is determined fulfilling the weighed combining of the normalized module of complex correlation pilot signal response at the antenna array output and the normalized value of the antenna array pattern in the reverse channel. The angle of arrival estimate is determined as a decision function maximum direction, and the sequence of the formed angle of arrival estimates is grouped into blocks each containing M estimates of angle of arrival. The sequence of vectors of block angle of signal arrival estimate distribution is determined for each block by M determined estimates of block signal angle of arrival, the vector of block angle of signal arrival estimates distribution the length of which is L, each element of which corresponds to one of L directions of the researched angular area and is equal to the number of angle of arrival estimates of this direction. The sequence of the averaged vectors of angle of arrival estimates distribution is determined from the sequence of block angle of arrival estimates distribution using sliding window.

For each averaged vector of angle of arrival estimate distribution, the estimates of top and bottom boundaries of the angular area are to be determined, The estimate of the average angle of arrival is determined by the obtained estimates of the top and the bottom boundaries of the angular area. Considering the geometry of the antenna array, the phase coefficients of the antenna array elements are determined using the determined estimate of average angle of arrival. The correlation matrix of the antenna array element signals is determined by the estimates of the top and the bottom boundaries of signal angular area thus obtained.

Further, Cholesky transformation of the formed correlation matrix is carried out, thus obtaining the bottom triangular matrix. The ratio of the antenna array elements amplitude coefficients to the amplitude coefficient of the antenna array element from which the pilot signal is transmitted is determined using the obtained bottom triangular matrix and phase coefficients of the antenna array. The normalized coefficient is determined by taking into account the number of the antenna array elements.

The amplitude coefficients of the antenna array are determined by the multiplication of the standard coefficient by the ratio of the antenna array element amplitude coefficients to the amplitude coefficient of the antenna array element from which the pilot signal is transmitted.

The generated amplitude and phase coefficients of the antenna array elements are used for transmission of the information symbol to a user.

The estimation of the top and bottom boundaries of signal angular area are performed, for example, in the following manner.

First, the maximum element of the averaged vector of angle of arrival estimates distribution is determined. Then, the top and bottom elements are determined as boundaries of the group of averaged angle of arrival estimate distribution vector, this group of the elements includes the maximum element of the averaged angle of arrival estimate distribution vector, and the elements of the group exceeds the threshold, but at each side from the maximum element single non-exceedings of the threshold can be permitted as well as one group non-exceeding of the threshold from two or three neighbor elements. The sum of the elements of the averaged angle of arrival estimates distribution vector is to be determined as well as the sum of the elements of the averaged angle of arrival estimates distribution vector that are located above the top element. The correction amendment for the bottom element is formed that depends on the sum of the elements of averaged angle of arrival estimates distribution that are located below the bottom element and the correction amendment for the top element is formed that depends on the sum of the elements of averaged angle of arrival estimates distribution that are located above the top element. The correction value for the top and the bottom elements is determined that depends on the location of the maximum element of averaged angle of arrival estimates distribution vector.

The estimate of the bottom signal angular area boundary is determined as the difference of the angular coordinate that corresponds to the bottom element and is determined as the sum of the correction amendment for the bottom element and the correction value. The estimate of the top signal angular area boundary is determined as the sum of the angular coordinate that corresponds to the top element, the correction amendment for the top element and the correction value.

The estimate of the average angle of arrival may be determined as a half-sum of the estimates of the top and the bottom boundaries of the signal angular area.

The ratio of the antenna array amplitude coefficients to the antenna array amplitude coefficient from which the pilot signal is transmitted may be equal to each other, and this ratio is determined as the maximum value from the interval from 0 to 1. For this antenna array ratio, the ratio of the average powers statistically non-coherent and statistically coherent summands of information signal model that is received by the user does not exceed the given value.

The proposed algorithm of the forward channel antenna pattern determined by the first embodiment consists of two stages. The first stage, the estimate of useful signal angular boundaries is determined. This estimate is carried out by the signal of the mobile user that is received by the BS. The second stage, the forward channel antenna pattern determination is fulfilled by the estimates of useful signal angular area boundaries that are obtained in the first stage.

The first stage of the forward channel antenna pattern forming algorithm (the estimate of the angular boundaries of useful signal area), which includes using the reverse channel antenna array weight coefficients $W_{up}$, consists of the following.

For each of L different directions $\theta_i$, $i=\overline{1,L}$ of the researched angular area, the module of "short" complex correlation pilot signal response at the antenna array output is determined by $$X(\theta_i) = \left| \sum_{n=1}^{N} a_n(\theta_i) u_n \right| \qquad (2)$$

where $a_n(\theta_i)=\exp[j\pi(n-1)\cos\theta_i]$, $n=\overline{1,N}$, $i=\overline{1,L}$ represents complex coefficients of each direction, $u_n$, $n=\overline{1,N}$ represents complex correlation pilot signal responses at the outputs of the antenna array elements correlators, N is a number of the antenna array elements.

The value of complex correlation pilot signal response module at the output of the antenna array from Equation 2 is normalized $$X\%(\theta_i)=X(\theta_i)/X_{max}, \ X_{max}=\max X(\theta_i), \ i=\overline{1,L} \qquad (3)$$

The discrete values of the reverse channel antenna array pattern are determined for the same directions $\theta_i$, $i=\overline{1,L}$ $$F(\theta_i) = |w_{up}^H a(\theta_i)| \qquad (4)$$

where $W_{up}$ is the vector of the weight coefficients of the adaptive antenna array elements in the reverse channel when receiving the users' signal that is obtained during the adaptation of the antenna array in the reverse channel and which takes into account the canceling of the powerful concomitant interferences, $(\bullet)^H$ is the operation of Hermitian conjugation., and $a_n(\theta_i)$ represents the vector of complex coefficients for the direction $\theta_i$.

The value obtain from Equation 4 is then normalized $$F\%(\theta_i)=F(\theta_i)/F_{max}, \ F_{max}=\max F(\theta_i), \ i=\overline{1,L} \qquad (5)$$

The decision function that is equal to the weighted sum of the complex correlation pilot signal response standard module at the output of the antenna array from Equation 3 and standard value of the reverse channel antenna array pattern from Equation 5 is formed $$R(\theta_i)=X\%(\theta_i)+\alpha F\%(\theta_i) \qquad (6)$$

where $\alpha$ is a weight coefficient.

The estimate of short measurement angle of signal arrival is determined as the direction (angular position) of the decision function maximum from Equation 6

$$\hat{\theta} = \underset{\theta_i}{\operatorname{argmax}} R(\theta_i) \qquad (7)$$

This equation represents the angle that maximizes $R(\theta_i)$.

All of the above-described operations are repeated M times, i.e., M angle of arrival estimates ("short" measurements) are produced. The sequence of the determined angle of arrival estimates is grouped into the blocks. Each block contains M angle of arrival estimates.

By M determined angle of arrival estimates, from Equation 7, of each block the estimate distribution vector of angle of arrival that is L length is determined, each element which corresponds to one of L directions and is equal to the number of angle of arrival estimates, generation in such a way the estimate distribution vector sequence of angle of arrival. The physical meaning of the angle of arrival block estimate distribution vector corresponds to the phenomenon of "short" angle of arrival estimates histogram.

From the sequence of the angle of arrival estimate distribution vectors the sequence of averaged angle of arrival estimate distribution vectors with the usage of sliding window is determined. The averaged angle of arrival estimate distribution vector by its physical meaning corresponds to the averaged histogram of angle of signal arrival estimates $Z(\theta_i)$, $i=\overline{1,L}$.

Further, the term "averaged angle of signal arrival estimates histogram" is equivalent to the term "averaged angle of arrival estimate distribution vector".

Figure 3:
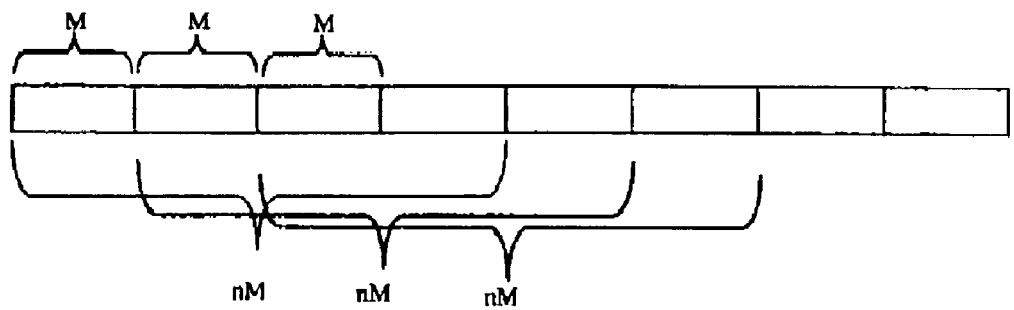
FIG. 3 illustrates an example of sliding window usage for obtaining an averaged vector of an estimated distribution of an angle of a signal arrival.

To obtain stability from its averaged histogram, the number of "short" measurements should be sufficiently large. On the other hand, for the consideration of fast changing interference-signal situation, it is necessary to balance large analysis time that is necessary for an averaged stable histogram generation, with the necessity of relatively short time interval between the decision about the bottom and top boundaries of the signal angular area. This compromise is provided by the sliding window usage, the organization of which is illustrated in FIG. 3. Thus, the decision about the estimates of the bottom and top signal area boundaries is made through M "short" measurements, and the averaged histogram is formed by n M "short" measurements.

The decision about the estimate of the bottom and the top signal area boundaries is made on the basis of an averaged angle of arrival estimates histogram $Z(\theta_i)$, $i=\overline{1,L}$ (the averaged angle of arrival estimates distribution vector). The analysis is carried out, for example, in the following way.

The position of averaged histogram maximum is determined $$\theta_{max} = \underset{\theta_i}{\mathrm{argmax}} Z(\theta_i) \quad (8)$$

Figure 4:
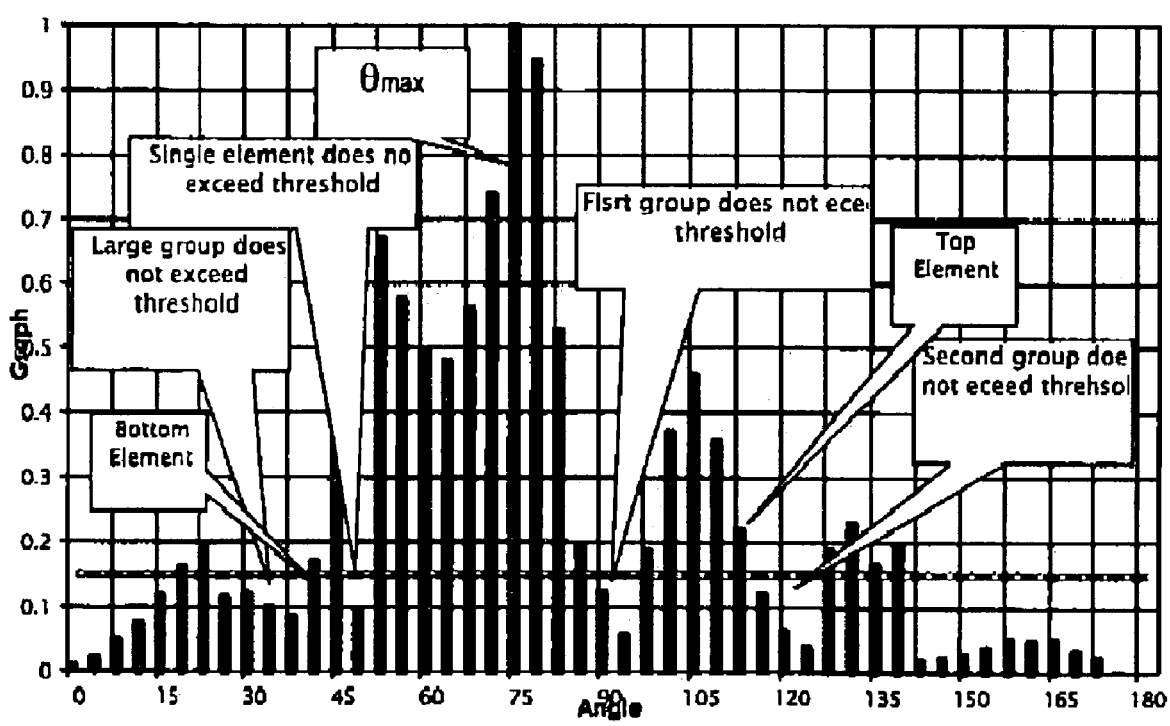
FIG. 4 illustrates an example of top and bottom element determination.

The bottom $\theta_1$ and the top $\theta_2$ angle coordinates of $\beta \cdot Z_{max}$ threshold crossing on the averaged histogram (bottom and top elements) are determined, as it is shown in FIG. 4. Here, $\beta$ is a system parameter that $0 \leq \beta \leq 1$. As $\theta_1$, $\theta_2$ values the last bottom (the last top) values $\theta$ are taken, for which $Z(\theta) > \beta Z_{max}$. For signal angular area single threshold nonexceedings are permitted (FIG. 4). One group of discrete angle values for which the histogram value does not exceed the threshold (FIG. 4) is also permitted on each side of $\theta_{max}$.

The probabilities of angle of arrival of the areas are calculated for $\theta < \theta_1$ and $\theta > \theta_2$, by $$P_1 = P(\theta > \theta\%_1), P_2 = P(\theta < \theta\%_2) \quad (9)$$

Figure 5:
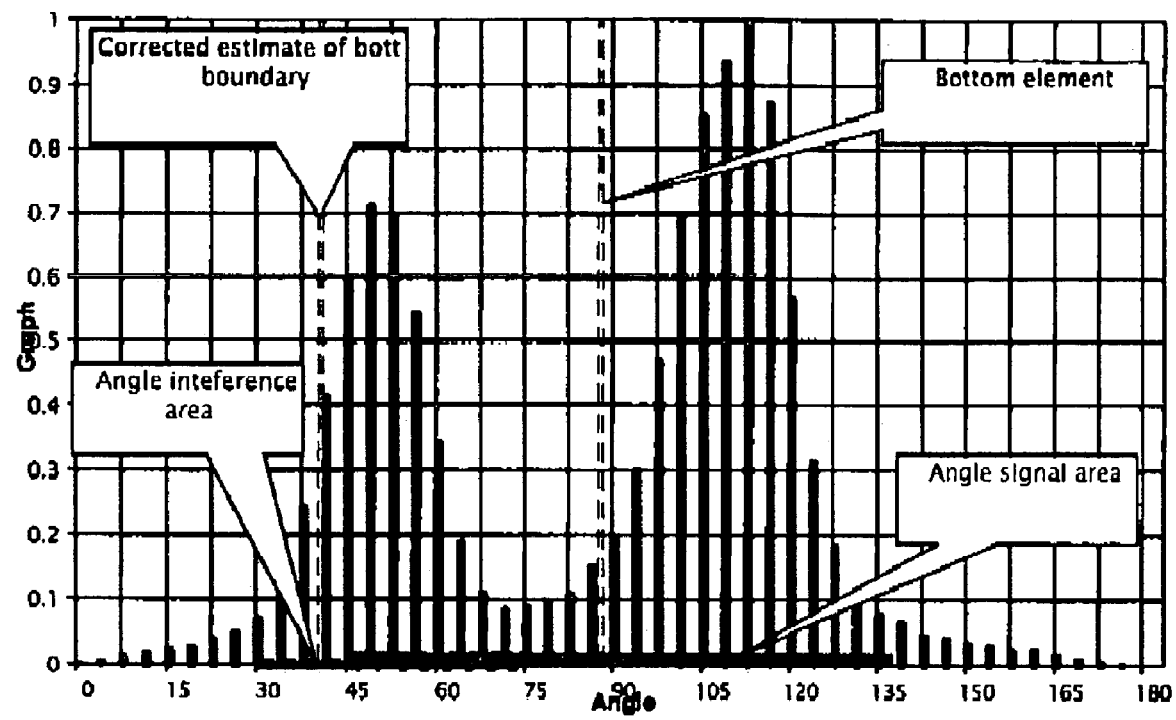
FIG. 5 illustrates an example of a highly elevated bottom element under an influence of powerful interference.

It is important to take into account the probabilities data in case of powerful interferences, when under the influence of them, some redistribution of the angle of arrival estimate positions into the interference angular area takes place as illustrated in FIG. 5. Therefore, a correction amendment $\theta c_1$ that depends on $P_1$, for $\theta_1$, and the correction amendment $\theta c_2$ that depends on $P_2$, for $\theta_2$ are formed to compensate for signal angular area loses.

The correction amendment $\theta a_1$, $\theta a_2$ for $\theta_1$ and $\theta_2$ are calculated as the functions that depend on the $\theta_{max}$ value, and the $\theta a_1$, $\theta a_2$ values are different from zero only for $\theta_{max}$ values that are close to 90° and may be equal to each other. The correction amendments are used to compensate for possible understatement of signal angular area estimate size. Here, $\theta$ c depends on $P_1$ and $P_2$, and $\theta$ a depends on $\theta_{max}$.

Finally, the estimates of the bottom and the top signal area boundaries $\hat{\theta}_1$ and $\hat{\theta}_2$ are determined, taking into account the obtained values in the following manner.

$$\hat{\theta}_1 = \theta\%_1 - \theta c_1 - \theta a_1 \quad (10)$$

$$\hat{\theta}_2 = \theta\%_2 + \theta c_2 + \theta a_2 \quad (11)$$

On the second stage of the proposed algorithm, the estimates of the average angle of arrival and angular sector of the signal are formed by the estimates of the bottom and the top signal angular area $\hat{\theta}_1$, $\hat{\theta}_2$.

$$\hat{\ } = \frac{\hat{\theta}_1 + \hat{\theta}_2}{2}, \hat{\Delta} = \hat{\theta}_2 - \hat{\theta}_1 \quad (12)$$

Figure 6:
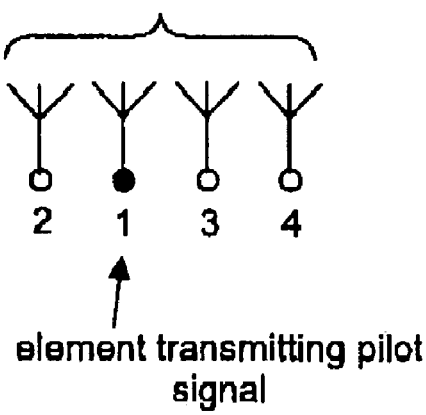
FIG. 6 illustrates an example of an antenna array elements numbering order.

For example, consider that the numeration of the antenna array elements may be arbitrary. Start the numeration, for convenience, from the element that radiates the pilot signal, for example, as it is illustrated in FIG. 6.

The information signal is transmitted by all the elements of the antenna array and the common pilot signal by one (the first) element of BS antenna array. It is preferable that this element is chosen in the middle of the antenna array as is illustrated in FIG. 6. Such a choice is caused by the necessity of relatively higher signal correlation of this element with the signals of other antenna array elements, and consequently, higher phase coherence between the signals of the information and pilot channels on the mobile station (MS).

Complex weight coefficients $w_n = w_n \exp(j\psi_n)$, $n=\overline{1,N}$ of the forward channel of the antenna array elements are determined in the following way.

Phase coefficients $_n$, $n=\overline{1,N}$ of the antenna array elements are determined by the estimate of average angle of arrival $\hat{\theta}$ and the antenna array geometry. For example, at N=4 and in the numeration order of equidistant antenna array elements, as is illustrated in FIG. 6, the phase coefficients are equal.

$$_1 = 0, \psi_2 = -\frac{2\pi}{\lambda} d \cos\hat{\theta}, \psi_3 = \frac{2\pi}{\lambda} d \cos\hat{\theta}, \psi_4 = \frac{4\pi}{\lambda} d \cos\hat{\theta}$$

where $\lambda$ is a receiving signal wavelength, and d is the distance between the adjacent elements of BS antenna array.

The phase of the first element is equal to zero. This element is zero point.

By the estimates of the bottom and the top signal angular area boundaries $\hat{\ }_1$, $\hat{\theta}_2$ the correlation matrix of the signals of K antenna array elements is determined.

$$K = \frac{1}{Q} \sum_{q=1}^{Q} a(\varphi_q) a^H(\varphi_q) \quad (13)$$

where, when taking into account the numeration, $a(\phi_q) = [\exp(j\xi), 1, \exp(2j\xi), \exp(3j\xi)]^T$, $$\xi = \frac{2\pi}{\lambda} d \cos(\varphi_q),$$

and

Q is the number of signal arrival paths, for example Q=500.

$$\varphi_q = \hat{\theta}_1 + \frac{(\hat{\theta}_2 - \hat{\theta}_1)(q-1)}{Q-1}, q = \overline{1, Q} \quad (14)$$

Cholesky transform of the correlation matrix of the signals of the antenna array elements K from Equation 14.

$$G = K^{1/2} \quad (15)$$

As the result the bottom triangular matrix is formed as described, for example, in J. Golub, Ch. Van Chan. Matrix calculations. /M.; Mir, 1999, p. 134, R. Horn, Ch. Jonson. Matrix analysis /M.; Mir, 1989, p. 141.

The improvement that is important is in the case of a singular matrix K. The essence of the improvement consists of the fact that, if in a Cholesky procedure on the main diagonal of G matrix, there appears an element that is equal to zero (or very small), then this phenomenon takes place for singular K matrices and all the other elements of G matrix are to be equal to zero. This improvement enables using a Cholesky transform at arbitrary values of angle of arrival estimates and an angular signal sector from Equation 12, including $\hat{A}=0$, when standard Cholesky transform usage is impossible.

The value of the small parameter $\gamma$ is chosen. For example, $$\gamma = 0.01 \div 0.05 \qquad (16)$$

The elements of G matrix and the phase coefficients $\psi_n$, n=$\overline{1,N}$ determine the function $f(\mu)$ that is the average power ratio of statistically non-coherent and statistically coherent summands of the information signal model that is received by the user. For example, for the four-element antenna array $$f(\mu) = \frac{\mu^2[|\exp(-j\psi_2)G_{2,2} + \exp(-j\psi_3)G_{3,2} + \exp(-j\psi_4)G_{4,2}|^2 + |\exp(-j\psi_3)G_{3,3} + \exp(-j\psi_4)G_{4,3}|^2 + |G_{4,4}|}{|1 + \mu(\exp(-j\psi_2)G_{2,1} + \exp(-j\psi_3)G_{3,1} + \exp(-j\psi_4)G_{4,1})|^2} \qquad (17)$$

The maximum $\mu$ value is determined from the interval from 0 to 1, for which the following inequality is fulfilled $$f(\mu) \leq \gamma \qquad (18)$$

The above inequality may be determined, for example, by numerical method calculating $f(\mu)$ function value for the different $\mu=1; 0.99; 0.98, \ldots$, until the condition from Equation 19 will not be fulfilled. The first value $\mu$ for which the inequality is fulfilled, is considered to be the final one.

The obtained $\mu$ value is used to determine the amplitude coefficients of the antenna array. If the ratio of amplitude coefficients of the antenna array elements to the amplitude coefficient of the antenna array element from which the pilot signal is transmitted are not equal to each other, then the amplitude coefficients of the antenna array are obtained from $$w_1 = k, \ w_2 = K = w_N = \mu k \qquad (19)$$

where k is a normalized coefficient that is obtained for example from the condition $$\sum_{n=1}^{N} w_n^2 = N \qquad (20)$$

at N=4

$$k = \frac{2}{\sqrt{1 + 3\mu^2}}.$$

Therefore, the formed complex weight coefficients of the antenna array elements are used for the transmission of the information signal to the user.

Referring to the first embodiment illustrated in FIG. 7, the method implementation will be described below.

Figure 7:
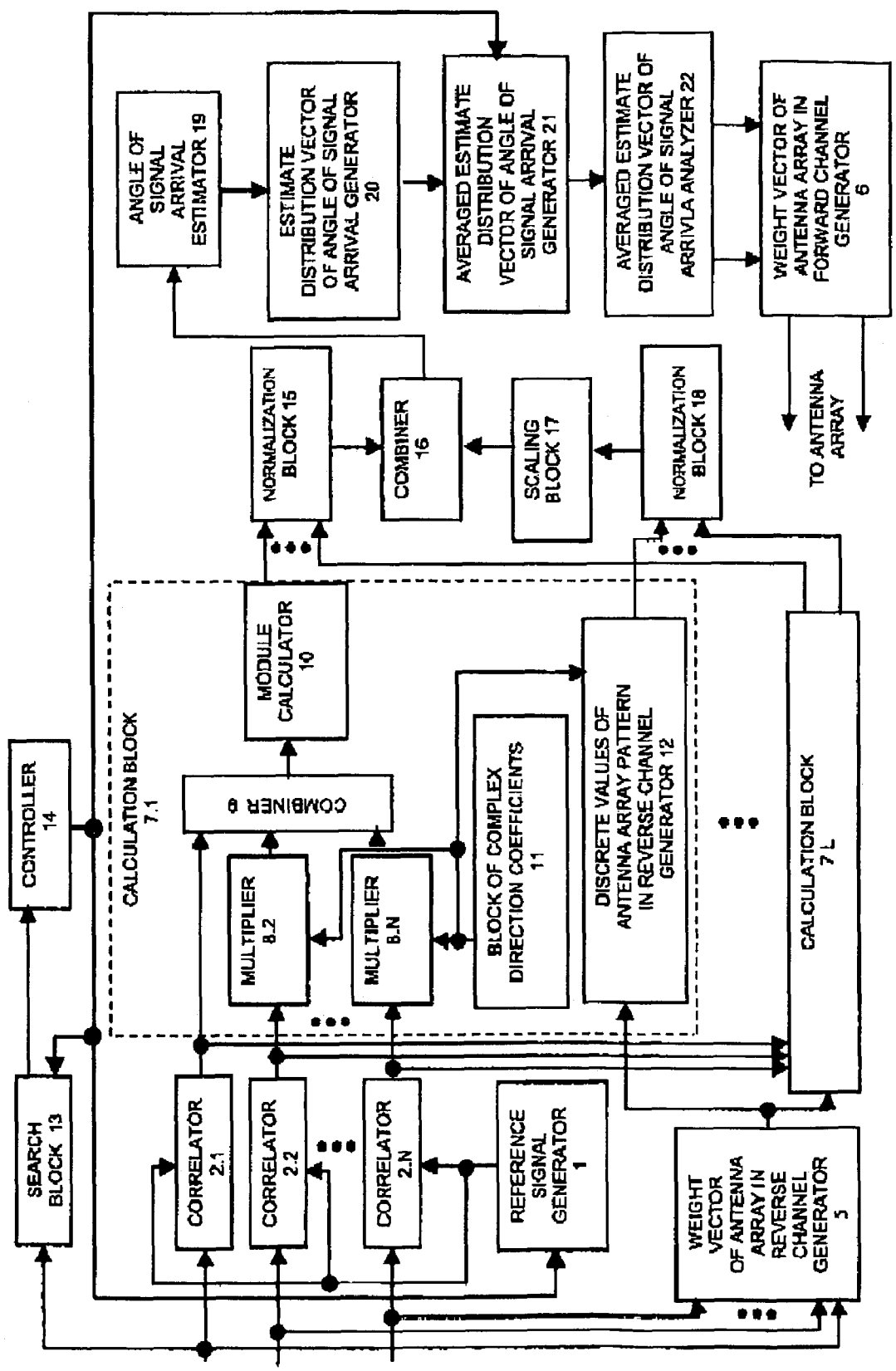
FIG. 7 is a block-diagram of a first embodiment of the present invention.

Referring to FIG. 7, the first embodiment contains N correlators 2.1-2.N, L decision function of direction calculation blocks 7.1-7.L, the first inputs of which are the inputs of pilot signal correlation responses of the antenna array elements and are connected to the inputs of the corresponding correlators 2.1-2.N, a search block 13, a controller 14, antenna array weight coefficients in the reverse channel generator 5, sequentially connected a first normalization block 15, a second combiner 16, angle of signal arrival estimator 19, estimate distribution vector of angle of signal arrival generator 20, an averaged estimate distribution vector of angle of signal arrival generator 21, an averaged estimate distribution vector of angle of signal arrival analyzer 22.

The outputs of the top and the bottom boundaries of the signal angular area are connected to the corresponding inputs of the antenna array weight coefficients in the forward channel generation block 6. Also included are a scaling block 17 and a second normalization block 18. The first inputs to correlators 2.1-2.N are the original signals. The second inputs to the correlators 2.1-2.N are reference signals from signal generator 1. The input of reference signal generator 1 is connected to the output of controller 14 that provides the synchronous operation of the device. The first input of the search block 13 is connected to the first input of the device, the second input of the search block 13 and is connected to the output of the controller 14. The output of the search block 13 is the decision search function and is connected to the input of the controller 14. Each decision function of the direction calculator 7.1-7.L contains N−1 multipliers 8.2-8.N, a first combiner 9, module calculation block 10, complex coefficients of the direction block 11 and the discrete values of the antenna array pattern in the reverse channel calculator 12. The first inputs of the multipliers 8.2-8.N and the first input of the first combiner 9 are connected to the outputs of the correlators 2.1-2.N, the output of the multipliers 8.2-8.N are connected to the inputs of the combiner 9, starting from the second one and up to N. Combiner 9 outputs the complex correlation response of this direction pilot signal at the antenna array output, and is connected to input of module calculation block 10. The output of module calculation block 10, that is the output of the module of complex correlation response of this direction pilot signal at the antenna array output, and the first output of each decision function of the 7.1-7.L direction calculating block is connected to the corresponding input of the first normalization block 15.

The first input of the antenna array pattern discrete values in the reverse channel calculator 12 is the second input of each block of decision function with the direction 7.1-7.L calculation and is connected to the output of the weight vector of antenna array in the reverse channel generator 5 that forms at its output the weigh coefficients of the antenna array elements in the reverse channel. Signal inputs of the weight vector of antenna array in the reverse channel generator 5 are connected to the device input. The second input of the antenna array pattern discrete values in the reverse channel calculator 12 and the second inputs of the multipliers 8.2-8.N are connected together and are connected to the output of complex direction coefficients 11 that outputs the complex coefficients for this direction.

The output of the discrete values of antenna array pattern in the reverse channel calculator 12 from each of decision function direction calculators 7.1-7.L is connected to the corresponding input of the second normalization block 18.

The output of the first normalization block 15, that outputs the normalized modules of the complex correlation pilot signal responses at the output of the antenna array for all L directions, is connected to the first input of the second combiner 16. The second normalization block 18 outputs the normalized values of the antenna array pattern in the reverse channel of all L directions, and is connected to the first input of the scaling block 17. The scaling block 17 outputs the weighted normalized values of the antenna array pattern in the reverse channel for all L directions and is connected to the second input of the second combiner 16. The second combiner 16 outputs the decision function values for all L directions, and is connected to the input of angle of signal arrival estimator 19, the output of which is the output of average angle of arrival estimate and is connected to the input of estimate distribution vector of angle of signal arrival generator 20 that forms at the output the sequence of vectors of angle of signal arrival estimate distribution (histogram of angle of signal arrival estimates). The output of the estimate distribution vector of angle of signal arrival generator 20 is connected to the input of averaged estimate distribution vector of angle of signal arrival generator 21, the second input of which is connected to the output of controller 14. The output of the estimate distribution vector of angle of signal arrival generator 20 outputs the averaged vector sequence of angle of arrival estimate distribution (averaged histogram of angle of signal arrival estimates) and is connected to the input of the averaged estimate distribution vector of angle of signal arrival analyzer 22. The outputs of the averaged estimate distribution vector of angle of signal arrival analyzer 22 that forms the top and the bottom boundaries of signal angular area are connected to the corresponding inputs of the antenna array weight coefficients in the forward channel generator 6. The output of the antenna array weight coefficients in the forward channel generator 6 is the output of the amplitude and the phase coefficients of the antenna array elements.

The complex multipath signal with the output of N elements of the antenna array is transmitted to the first (signal) inputs of the correlators 2.1-2.N and the inputs of weight vector generation block of antenna array in the reverse channel 5.

Simultaneously, the complex multipath signal from the first element of the antenna array is transmitted to the input of the search block 13. The search block 13, utilizing the pilot signal, forms the decision function of path signal search in the discrete time positions. This information from the search block 13 is transmitted to the controller 14 that compares the received values of the search decision function with the threshold, and by the threshold exceedings, it determines the time positions of the path signals. In the controller 14, the obtained values of the decision function for the detected path signals are compared to each other and the time position of path signal with the maximum value of the decision function (maximum power) is determined.

From the control signal, which is the output of the controller 14, the reference signal that corresponds to the signal of maximum power path is transmitted from the output of reference signal generator 1 to the second inputs of the correlators 2.1-2.N.

In the correlators 2.1-2.N the complex correlation responses of the pilot signal of the antenna array elements $u_n$, $n=\overline{1,N}$ on the short time intervals by J chips length, for example.

The correlation responses of the antenna array elements pilot signal are transmitted to the first inputs of L blocks of decision function direction calculators 7.1-7.L, namely, at the first input of the combiner 9 and at the first inputs of the corresponding (complex) multipliers 8.2-8.N. The number of L blocks of the decision function calculation direction 7.1-7.L is equal to the number of different directions of the researched angular area.

In weight vector of antenna array in the reverse channel generator 5, the weight coefficients of the adaptive antenna array elements are determined for the reverse channel during the users' signal reception, for example, in accordance with one of the algorithms proposed by: R. A. Monzingo, and T. U. Miller. "The Adaptive Antenna Arrays"; Radio and communications, 1986, p. 77-90; and A. A. Pistolkors, O. S. Litvinov, "The Introduction into the Adaptive Arrays theory", M., Nauka, 1991. These coefficients are transmitted at the second inputs of decision function direction calculators 7.1-7.L, namely, at the first inputs of the reverse channel discrete value calculators 12.

In the complex direction coefficients 11, there are complex coefficients $a_n(\theta_i)$, $n=\overline{1,N}$ for i-th direction, $i=\overline{1,L}$. These coefficients are calculated by the algorithm from, for example, Joseph C., Liberti, Jr., Bellcore, and Theodore S. Rappaport, "Smart Antennas for Wireless Communications", Prentice Hall PRT, 1999, p. 86-88. The complex coefficients of the direction $a_n(\theta_i)$, $n=\overline{1,N}$ are transmitted at the second inputs of the corresponding (complex) multipliers 8.2-8.N and at the second inputs of the reverse channel discrete value calculator 12.

From Joseph C., Liberti, Jr., Bellcore, and Theodore S. Rappaport, "Smart Antennas for Wireless Communications", Prentice Hall PRT, 1999, p. 86-88, the complex coefficient $a_1(\theta_i)=1$, thus the number of the multipliers that are used in the decision function of the direction calculator 7, is equal to N−1.

In each multiplier 8.2-8.N, the operation of the corresponding complex correlation pilot signal responses of the antenna array elements and complex coefficients $a_n(\theta_i)$, $n=\overline{1,N}$ of each direction multiplication is realized.

The output signals of the multipliers 8.2-8.N and complex correlation pilot signal responses of the antenna array first element from the output of the first correlator 2.1 are transmitted to the inputs of the combiner 9, and combined. The signal from the output of the combiner 9 is the complex correlation pilot signal response of $\theta_i$ direction at the output of the antenna array.

The output signal of combiner 9 is transmitted to the input of the calculating block of module 10, where the squares root from the sum of squares of real and imaginary signal part is calculated. The output signal of the calculating block 10 is equal to the complex correlation response of the pilot signal of $\theta_i$ direction at the output of the antenna array. From the output of module calculating block 10 the signal is transmitted to the corresponding input of first normalization block 15. In normalization block 15, for L different directions, the maximum module of the complex correlation response of the pilot signal at the antenna array output is determined by comparing of modules of the complex correlation responses of the pilot signal of different directions at the antenna array $Z(\theta_i)$ output with each other, and the normalized modules of the complex correlation responses of the pilot signal at the antenna array output for L different directions are determined. The normalization is carried out by determining the ratio of the modules of the complex correlation responses of the pilot signal at the antenna array output for L different directions to the maximum module. The obtained normalized signals for L different directions are transmitted to the first inputs of combiner 16.

In the discrete values of antenna array pattern in reverse channel calculator 12 for each of L different directions $\theta_i$, $i=\overline{1,L}$ of the researched angular area, the value of the antenna array pattern in reverse channel is determined according to the algorithm as illustrated above. These values are transmitted to the inputs of normalization block 18. In normalization block 18 for L different directions the maximum value of the antenna array pattern in the reverse channel is determined by comparing the values of antenna array pattern in the reverse channel for the different directions with each other, and the normalized values of the antenna array pattern in the reverse channel for L different directions are determined. The normalization is completed the determining the ratio of the antenna array pattern in the reverse channel for L different directions to the maximum value. The obtained normalized values of the antenna array pattern in the reverse channel for L different directions are transmitted to the input of scaling block 17. In scaling block 17 the weighted normalized values of the antenna array pattern in the reverse channel for L different directions are determined by multiplying the normalized values of the antenna array pattern in the reverse channel for L different directions by weight coefficient α. The determined values are transmitted to the second input of combiner 16. At the input of combiner 16 for L different directions $\theta_i$, i=$\overline{1,L}$ of the researched angular area, the decision function is determined by summing the normalized modules of the complex correlation responses of the pilot signal at the output of the antenna array and weighted normalized values of the antenna array pattern in the reverse channel. The values of the decision function are transmitted to angle of signal arrival estimator 19, in which the maximum value of the decision function is determined by comparing with each other the values of the decision function for L different directions $\theta_i$, i=$\overline{1,L}$ of the researched angular area. The estimate $\tilde{\theta}$ of the angle of signal arrival in the reverse channel that is determined at the short time interval is determined by the decision function maximum position.

The estimates $\tilde{\theta}$ of the angle of signal arrival in the reverse channel are transmitted to the input of estimate distribution vector of angle of signal arrival generator 20. In estimate distribution vector of angle of signal arrival generator 20 the sequence of the determined estimates of the angle of signal arrival is grouped into the blocks each of which contains M estimates of the signal angle of arrival.

Figure 8:
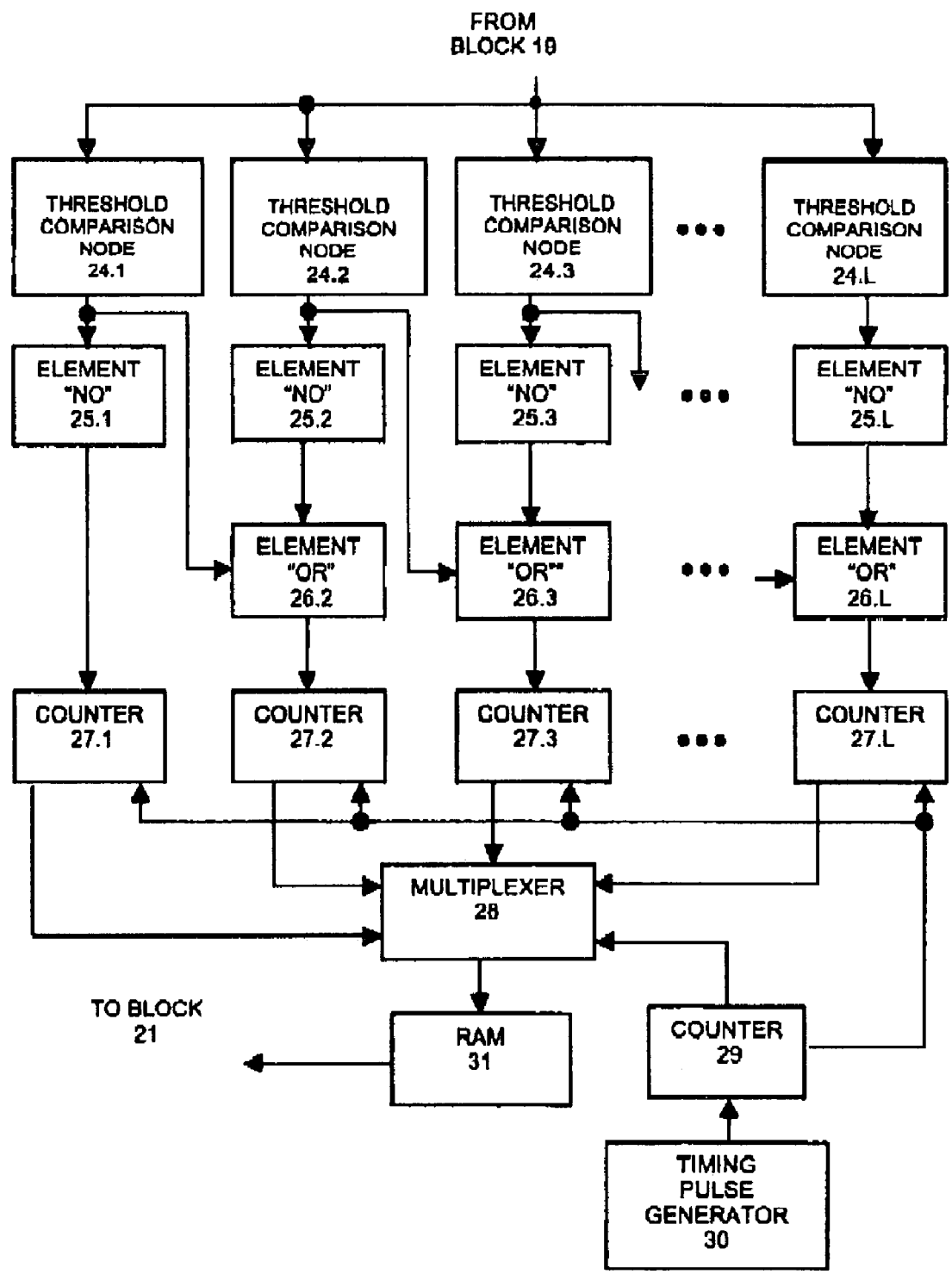
FIG. 8 illustrates an embodiment of the vector of estimate distribution of angle of signal arrival generator.

The embodiment of estimate distribution vector of angle of signal arrival generator 20 is illustrated in FIG. 8. Estimate distribution vector of angle of signal arrival generator 20 will be described below.

The sequence of the determined formed estimates of angle of signal arrival is transmitted to L parallel threshold comparison nodes 24.1-24.P. Each threshold corresponds to one of L directions. If the estimate of,angle of signal arrival is greater than the i-th threshold and less than the (i+1)-th threshold, then as the result of logical operation of elements "NO" 25.1-25.P, as well as element "OR" 26.2-26.P, the value of the i-th counter 27 increases, and the other counters values do not change. The final value of the i-th counter 27 determines the number of the estimates that correspond to the i-th signal angle of arrival. Counters 27.1-27.P calculate the number of estimates of angle of signal arrival that are greater than zero and less than the closest to the zero value of the researched signal arrival direction.

Counter 29 generates two signals with a period that is equal to the interval of receiving at the input of block M, estimates of angle of arrival, and timing pulses shifted at one period toward each other. By the first signal of M value, counters 27.1-27.P that determine the number of estimates corresponding to angle of signal arrival are rewritten through multiplexer 28 in random-access memory (RAM) 31. By the second signal, all counters 27.1-27.P are set into zero state. Timing pulse generator 30 specifies the frequency of the timing pulses of counter 29.

Thus, from M estimates of angle of signal arrival the vector of angle of signal arrival, estimate distribution L length is determined, each element of which corresponds to one of L directions and is equal to the number of estimates of angle of signal arrival of this direction.

Figure 9:
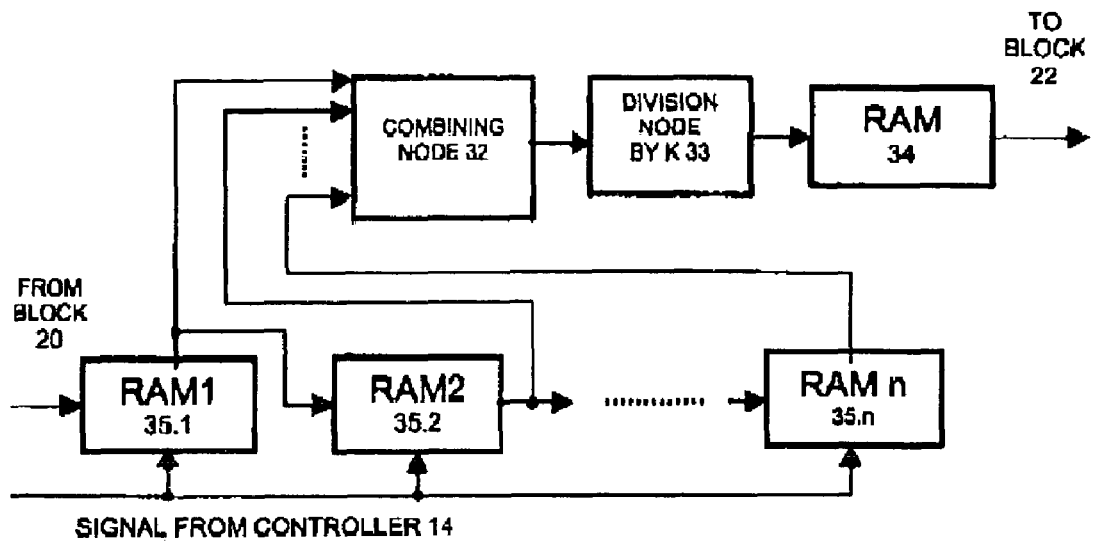
FIG. 9 illustrates an embodiment of the averaged vector of estimate distribution of angle of signal arrival generator.

The sequence of vectors of angle of signal arrival estimates distribution from the output of the angle estimate distribution vector generator 20 is transmitted to the input of averaged estimate distribution vector of angle of signal arrival generator 21, the embodiment of which is illustrated in FIG. 9. Averaged estimate distribution vector of angle of signal arrival generator operates in the following way.

During the operation by the control signal, the elements of the current vector of angle of signal arrival estimate distribution from the angle estimate distribution vector generator 20 are written to RAM1 35.1. During the transmission to the input of estimate distribution vector of angle of signal arrival generator 20 by the control signal for the next vector, the value of the current vector of angle is rewritten from RAM1 35.1 to RAM2 35.2, and the value of the next vector of estimate distribution vector of angle of signal arrival generator are written to RAM1 35.1. Each time, during the transmission to the input of the elements of the next vector of estimate distribution vector of angle of signal arrival generator 20, by the control signal the analogous sequential rewrite of the elements of vector of angle of signal arrival estimate distribution from one RAM 35 to another.

After the rewrite of the elements of vector of angle of signal arrival estimate distribution from one RAM 35 to another, the parallel read of the elements of vector of angle of signal arrival estimate distribution from all RAM 35 at the input of summing node 32 takes place, in which the summing up of all these vectors is accomplished. Combining results, divided by K=nM in the dividing node 33, are written in RAM 34 (n-number of vectors of angle of signal arrival estimate distribution that are used during the averaging, M-number of angle of arrival estimates that are used during the forming of vector of angle of signal arrival estimate distribution). From the output of RAM 34 the elements of the averaged vector of angle of signal arrival estimate distribution are transmitted from the output of averaged estimate distribution vector of angle of signal arrival generator 21 and to the averaged vector of angle of signal arrival estimate distribution analyzer 22.

Figure 10:
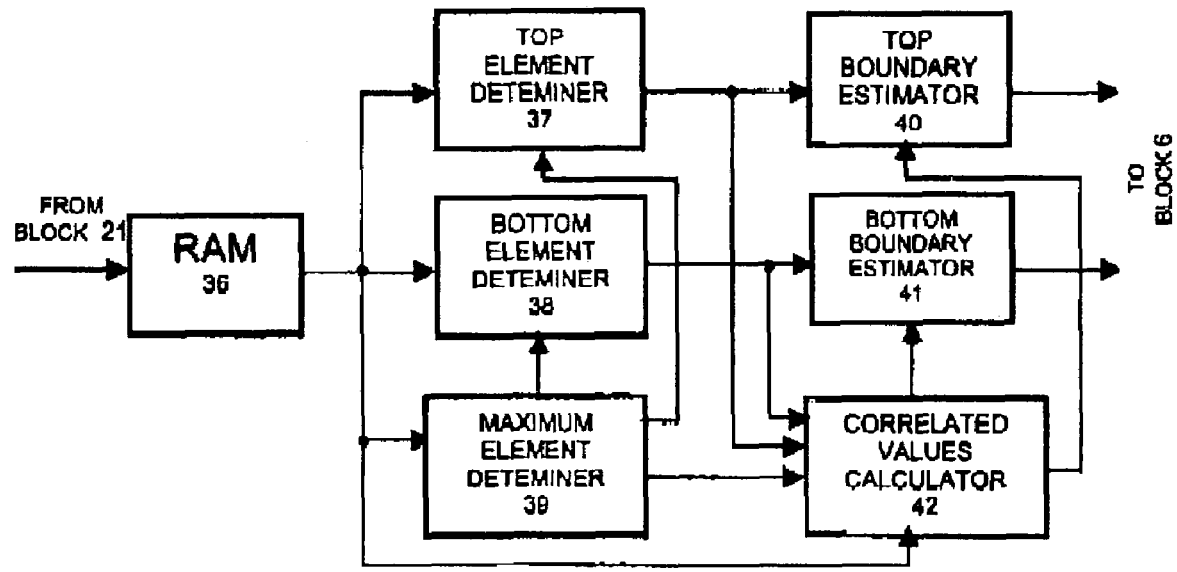
FIG. 10 illustrates an embodiment of the vector of estimate distribution of angle of signal arrival analyzer.

The embodiment of the averaged vector of angle of signal arrival estimate distribution is illustrated in FIG. 10, and operates in the following manner.

The input elements of the averaged estimate distribution vector of angle of signal arrival analyzer 22 are written to RAM 36. Then these elements are read into the top element determiner 37, bottom element determiner 38, maximum element determiner 39, and correction values calculator 42.

In the maximum element determiner 39, the maximum element of the averaged vector of angle of signal arrival estimate distribution that is chosen is transmitted to the top element determiner 37, to the bottom element determiner 38, and to the corrective values calculator 42. In the top element determiner 37 of the averaged vector of angle of signal arrival estimate distribution, the top element is determined as the top boundary of the group of elements of the averaged vector of angle of signal arrival estimate distribution that exceeds the given threshold. For this group of elements that are above the maximum element, single threshold non-exceedings are permitted, as well as one group threshold non-exceeding from two or three neighbor elements. In the bottom element determiner 38, the bottom element of the averaged vector of angle of signal arrival estimate distribution is determined analogously.

At the inputs of corrective values calculator 42, the values of the top, the bottom, and the maximum elements of vector of angle of signal arrival estimate distribution are transmitted. In the corrective values calculator 42, the sum of the elements of the averaged vector of angle of signal arrival estimate distribution that are below the bottom element is determined and the sum of the elements of the averaged vector of angle of signal arrival estimate distribution that are below the top element is also determined. The correction amendment for the bottom element that depends on the sum of the elements of the averaged vector of angle of signal arrival estimate distribution, which is located below the bottom element, is determined, as well as correction amendment for the top element that depends on the sum of the elements of the averaged vector of angle of signal arrival estimate distribution, which is located above the top element. The correction value for the bottom and the top elements is determined depending on the maximum element position. The correction for the top element and the correction value are transmitted to the top boundary estimator 40. The correction amendment for the bottom element and the correction value are transmitted to node of the estimation of the bottom boundary 41.

In the bottom boundary estimator 41, the adjusted estimate of the bottom boundary of the signal angular area is determined as the difference of the bottom element and the sum of the correction amendment for the bottom element and the corrective value.

In the top boundary estimator 40, the adjusted estimate of the top boundary of the signal angular area is determined as the sum of the top element of the correction amendment for the top element and the correction value.

The estimates of the top and bottom boundaries of the signal angular area from the output of the averaged vector of angle of signal arrival estimate distribution analyzer 22 are transmitted to the inputs of the antenna array weight coefficients in the reverse channel generator 6.

Figure 11:
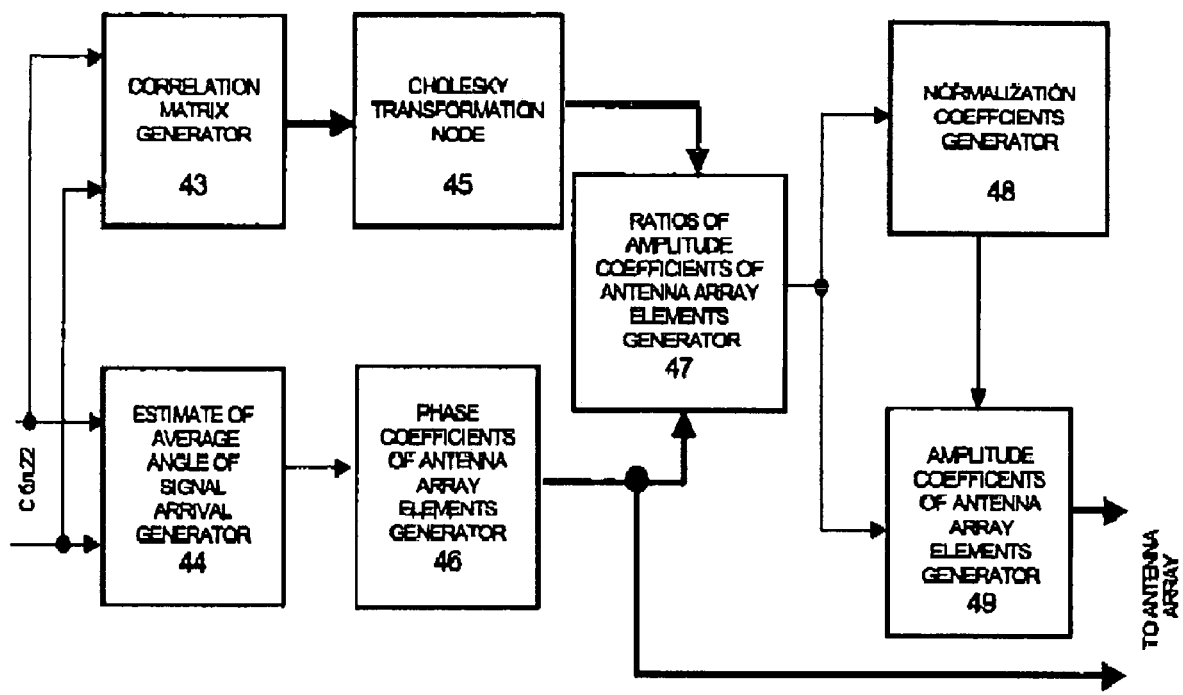
FIG. 11 illustrates an embodiment of the forward channel antenna array weight coefficients vector generator.

The embodiment of the antenna array weight coefficients in the reverse channel generator 6 is presented in FIG. 11.

The antenna array weight coefficients in the reverse channel generator 6 will be described herein below.

The adjusted estimates of the bottom and the top boundaries of the signal angular area are the output signals of the averaged vector of angle of signal arrival estimate distribution analyzer 22 and are transmitted to the input of the weight vector of antenna array in the forward channel generator 6, namely at the inputs of correlation matrix generator 43 and estimate of average angle of signal arrival generator 44. Functional scheme of the weight vector of antenna array in the forward channel generator 6 may be realized on modern microprocessors of digital signal processing (DSP), such as a TMS 320Cxx, a Motorola 56xxx, an Intel, etc.

In average angle of arrival estimate generator 44, from the estimates of the bottom and top boundaries of the signal angular area the estimate of average angle of arrival is determined as a half-sum of the estimates of the bottom and top boundaries of the signal angular area $$\hat{\theta}_1, \hat{\theta}_2, \text{ i.e., } \hat{\theta} = \frac{\hat{\theta}_1 + \hat{\theta}_2}{2},$$

and is transmitted to the input of the phase coefficients of the antenna array elements generator 46. The phase coefficients of the antenna array elements are determined by the estimate of average angle of arrival, taking into account the antenna array geometry. For example, at N=4 and in the numeration order of the equidistant antenna array elements as illustrated in FIG. 6, for example, the phase coefficients of the antenna array elements are equal, as shown in Equation 13.

The calculated weight coefficients of the antenna array elements are transmitted to the first input of ratios of the antenna array elements amplitude coefficients generator 47 and to the output of the antenna array pattern weight coefficients in the forward channel generator 6.

In correlation matrix generator 43, using the estimates of the bottom and the top boundaries of the signal angular area $\hat{\theta}_1, \hat{\theta}_2$, the elements of the correlation matrix K are calculated in accordance with the Equation (14).

The elements of the correlation matrix are transmitted to the input of Cholesky transformation node 45, where, using the algorithm proposed in, for example, J. Golub, Ch. Van Loun. Matrix Calculations. M.: Mir, 1999, p. 134, and P. Horn, Ch. Jonson. Matrix Analysis. M.: Mir, 1989, p. 141, the bottom triangular matrix is determined, the elements of which are transmitted to the first input of ratios of the antenna array pattern element amplitude coefficients generator 47. In this generator, the processing algorithm that is presented in FIG. 12 may be realized.

Figure 12:
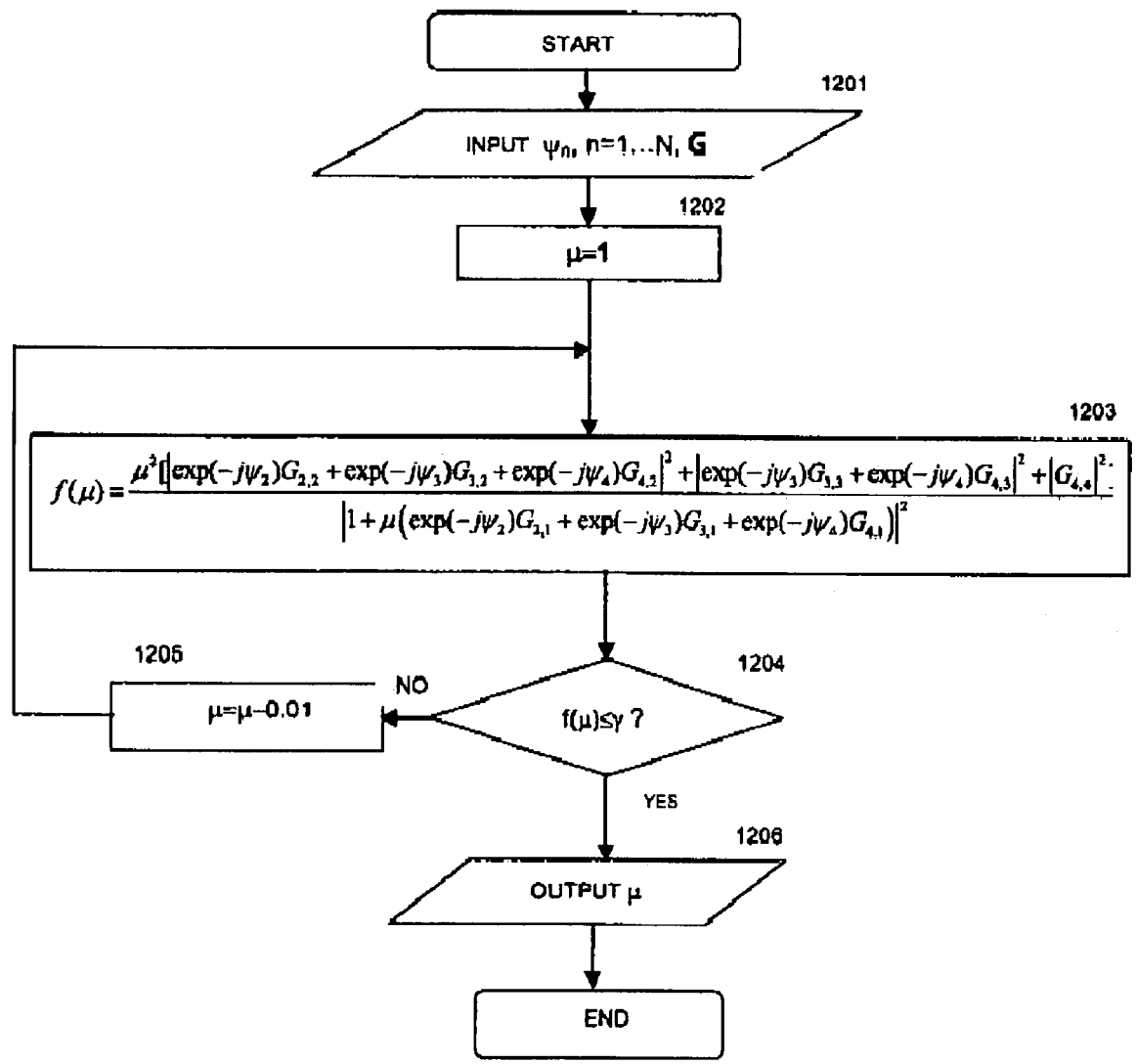
FIG. 12 illustrates an operation algorithm of a ratio generation node of antenna array elements amplitude coefficients.

FIG. 12 is a flowchart of the operation of ratios of amplitude coefficients of antenna array elements generator 47. The proposed algorithm of ratios of the antenna array pattern element amplitude coefficients generator 47 includes the following order of operations. In step 1201, ψ for n=1 ... N, G are input. In step 1202, μ (i.e. the ratio of the antenna array elements amplitude coefficients to amplitude coefficient of the antenna array element from which pilot signal is transmitted) is set to 1. Using phase coefficients of the antenna array elements the elements of the bottom triangular matrix and given μ value, the ratio ƒ(μ) of average powers of statistically non-coherent and statistically coherent summands of info signal model that is received by the user is calculated in step 1203. The value of the small γ (for example, γ=0.01÷0.05) parameter is chosen in advance and compared with the value ƒ(μ) in step 1204. If ƒ(μ)≦γ is true, then the current value of is output at step 1206, and the process ends. Otherwise, the value of μ is decreased by 0.01 in step 1205 and the value of ƒ(μ) function for different μ=1; 0.99; 0.98, ..., which is compared with the parameter γ. The procedure is to be continued up to ƒ(γ)≦γ condition full fulfillment.

This signal is transmitted at the input of normalization coefficients generator 48 and at the first input of the antenna array elements amplitude coefficients generator 49. In normalization coefficients generator 48 the normalization coefficient k is determined based on the received value μ and from the number of the antenna array elements. The value of the normalizing coefficient k transmits to the second input of the antenna array elements amplitude coefficients generator 49, where by the obtained value μ and the normalization coefficient k amplitude weight coefficients are determined by Equation 20.

Amplitude weight coefficients along with the phase coefficients are the output signals of the antenna array elements weight coefficients in the forward channel generator 6.

The obtained amplitude and phase coefficients of the antenna array elements are used for the transmission of information signal to the user in the forward channel.

Controller 14, may be realized on the modern microprocessors of digital signal processing (DSP), such as a TMS 320Cxx, a Motorola 56xxx, an Intel, etc.

Search block 13 in the proposed device may be implemented as it is shown in Zhuravlev V. I. "Search and Synchronization in Broadband Systems", M., Radio and communications, 1986, p. 24.

Figure 14:
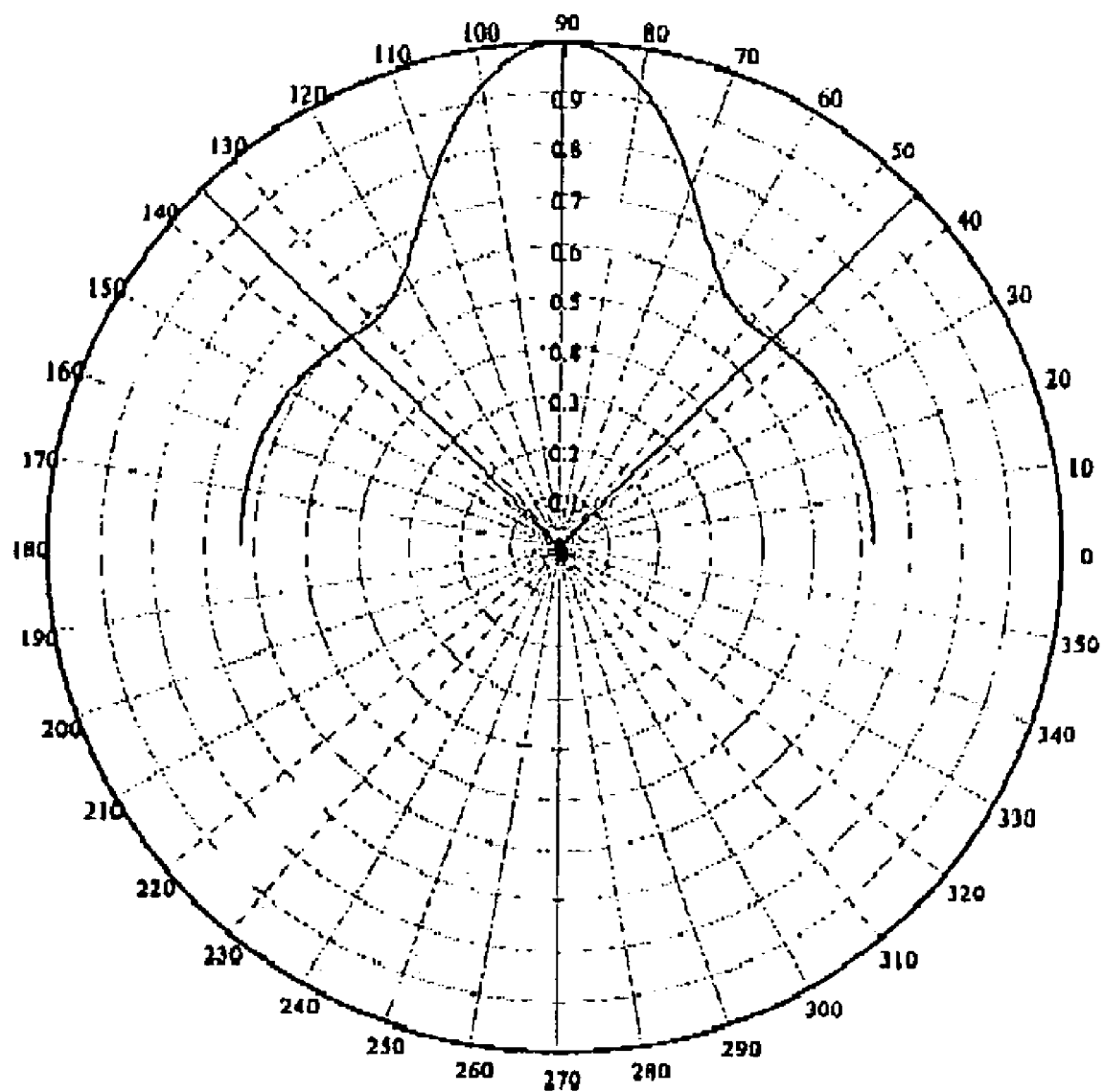
FIG. 14 illustrates an antenna pattern of a forward channel, where $\hat{\theta}=\pi/2$, $\hat{\Delta}=\pi/2$, $\mu=0.13$.
Figure 15:
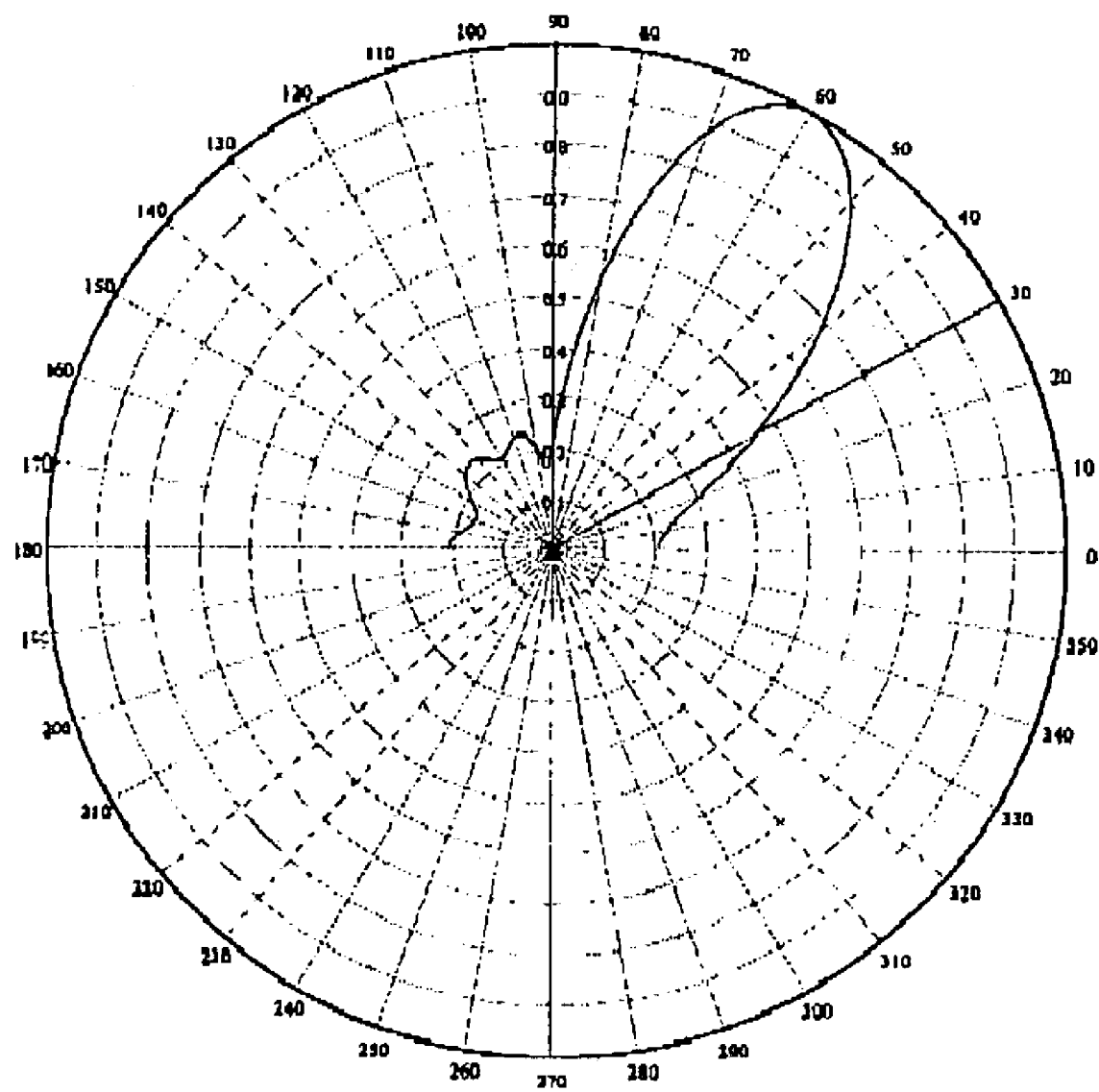
FIG. 15 illustrates an antenna pattern of a forward channel, where $\hat{\theta}=\pi/3$, $\hat{\Delta}=\pi/3$, $\mu=0.49$.
Figure 16:
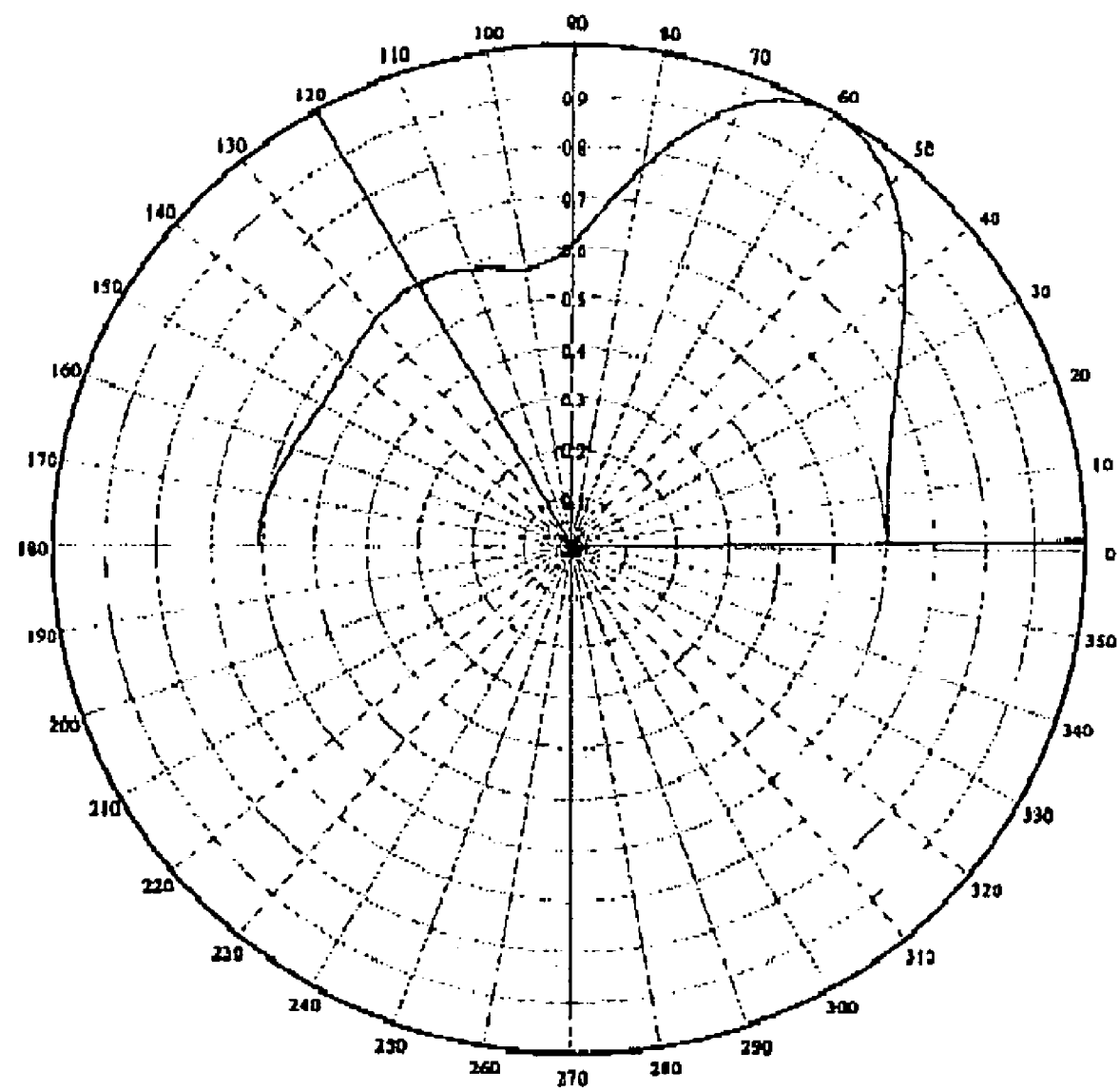
FIG. 16 illustrates an antenna pattern of a forward channel, where $\hat{\theta}=\pi/3$, $\hat{\Delta}=2\pi/3$, $\mu=0.14$.

In FIGS. 14, 15, and 16 the antenna patterns of the forward channel for different signal angular areas (built in accordance with the presented method) are presented.

The second embodiment of a BS adaptive antenna array pattern forming consists of the following:

For each user, the search of user signal is carried out by determining the time positions of path signals, the signal with the maximum power is chosen. Then, the estimate of average angle of signal arrival is periodically formed, and the complex correlation pilot signal responses of the antenna array elements are determined. For each of L different directions $\theta_i$, $i=\overline{1,L}$ of the angular area the complex correlation pilot signal responses at the antenna array output are determined by adding the products of the complex correlation pilot signal responses of antenna array elements to corresponding complex coefficients of each direction. The modules of complex correlation pilot signal responses at the antenna array output for L different directions are determined. The combined correlation response of the pilot signal at the antenna array output is determined by summing the modules of complex correlation pilot signal responses at the antenna array output for L different directions, and the maximum correlation response is determined.

The normalized combined complex correlation pilot signal responses at the antenna array output L for different directions are determined by finding the ratios of complex correlation pilot signal responses at the antenna array output for L different directions to maximum combined correlation response. The complex weight coefficients of the antenna array elements in the reverse channel during the reception of the users' signal.

For each of L different directions $\theta_i$, $i=\overline{1,L}$ of the researched angular area the antenna array pattern values are determined in the reversed channel. The maximum value (from the formed values of antenna array pattern in the reverse channel) is determined. The normalized values of the antenna array pattern in the reverse channel for L different directions are determined by finding the ratio of values of antenna array pattern to the maximum value.

For each from L different directions $\theta_i$, $i=\overline{1,L}$ of the researched angular area, the decision function is determined by fulfilling the weighed combining of the normalized combined complex correlation pilot signal response at the antenna array output and normalized value of the antenna array pattern in the reversed channel. The direction of the decision function maximum is determined by generating the estimate of average angle of signal arrival. Considering the geometry of the antenna array, the phase coefficients of antenna array elements are determined using the formed estimate of average angle of signal arrival. The amplitude coefficients of the antenna array elements are set equal to each other, amplitude and phase coefficients of the antenna array elements are used to transmit the signal to the user.

During the summing up of modules of complex correlation pilot signal responses at the output of the antenna array for L different directions the number of additives is to be permanent or to be chosen adaptively depending on the estimate of signal fading.

In accordance with this algorithm, the antenna array pattern determination in the forward channel is carried out by the signal of the reverse channel.

Smart antenna pattern determination in the forward channel will be described below.

In the base station, from all of the detected user signal time paths, the maximum time path is chosen based on its power path signal. In the first stage, the maximum estimate of average angular path power signal arrival is set. In the second stage, the antenna pattern of adaptive antenna array in the forward channel is determined, the maximum of which is set in the direction of the estimate of average angular of signal arrival. Complex weight coefficients are determined by:

$$w=\{\exp[j\pi(n-1)\cos\hat{\theta}]\}, n=\overline{1,N}, \qquad (21)$$

where $\hat{\theta}$ is the estimate of average angular of signal arrival in the reverse channel.

The algorithm of determination of the direction MS signal arrival $\hat{\theta}$ is based on weigh coefficients vector of the reverse channel usage as well as the pilot signal accumulation and consists of the following.

For each of L different directions $\theta_i$, $i=\overline{1,L}$ of the researched angular area:

M complex correlation pilot signal responses are determined at the output of the antenna array by the following:

$$X_k^\%(\theta_i) = \sum_{n=1}^{N} a_n(\theta_i)u_n, \quad k=\overline{1,M} \qquad (22)$$

where $u_n$, $n=\overline{1,N}$ represents complex correlation responses of a pilot signal at the output of the antenna array element correlators at a rate of J chips each, and $a_n(\theta_i)=\exp[j\pi(n-1)\cos\theta_i]$, $n=\overline{1,N}$, $i=\overline{1,L}$.

Non-coherent accumulation of M modules of complex correlation responses are determined by the following:

$$Z(\theta_i) = \sum_{k=1}^{M} |X_k^\%(\theta_i)| \qquad (23)$$

During the summing of the modules of the complex correlation pilot signal responses at the output of the antenna array the number of additives is set, to be permanent or is chosen adaptively depending on signal fading frequency, in such a way that the full duration of non-coherent accumulation is determined over several fading periods. Otherwise, due to fade-out of useful signal, the error in the estimate of angle of arrival is possible.

The value obtained from Equation 24 is normalized yielding:

$$Z\%(\theta_i)=Z(\theta_i)/Z_{max}, \ Z_{max}=\max Z(\theta_i) \qquad (24)$$

The discrete values of the antenna array pattern in the reverse channel are formed by $$F(\theta_i) = |w_{up}^H a(\theta_i)| \qquad (25)$$

where $w_{up}$ is a vector of adaptive antenna array weight coefficients in the reverse channel that is obtained taking into account the presence of powerful corresponding interferences;, $(\cdot)^H$ is the signal reception operation of Hermitian conjugation, and $a_n(\theta_i)$ represents the vector of complex coefficients for the direction $\theta_i$.

The value obtained in Equation 26 is normalized yielding:

$$F\%(\theta_i)=F(\theta_i)/F_{max}, \quad F_{max}=\max F(\theta_i) \quad (26)$$

The decision function is formed as the weighted sum of Equations ((24) and ((26)

$$R(\theta_i)=Z\%(\theta_i)+\alpha F\%(\theta_i) \quad (27)$$

where $\alpha$ is a weight coefficient.

The desired estimate $\hat{\theta}$ of average angular of MS signal arrival is determined by the position of decision function maximum in Equation ((27), as given by:

$$\hat{\theta} = \operatorname*{argmax}_{\theta_i} R(\theta_i) \quad (28)$$

Figure 13:
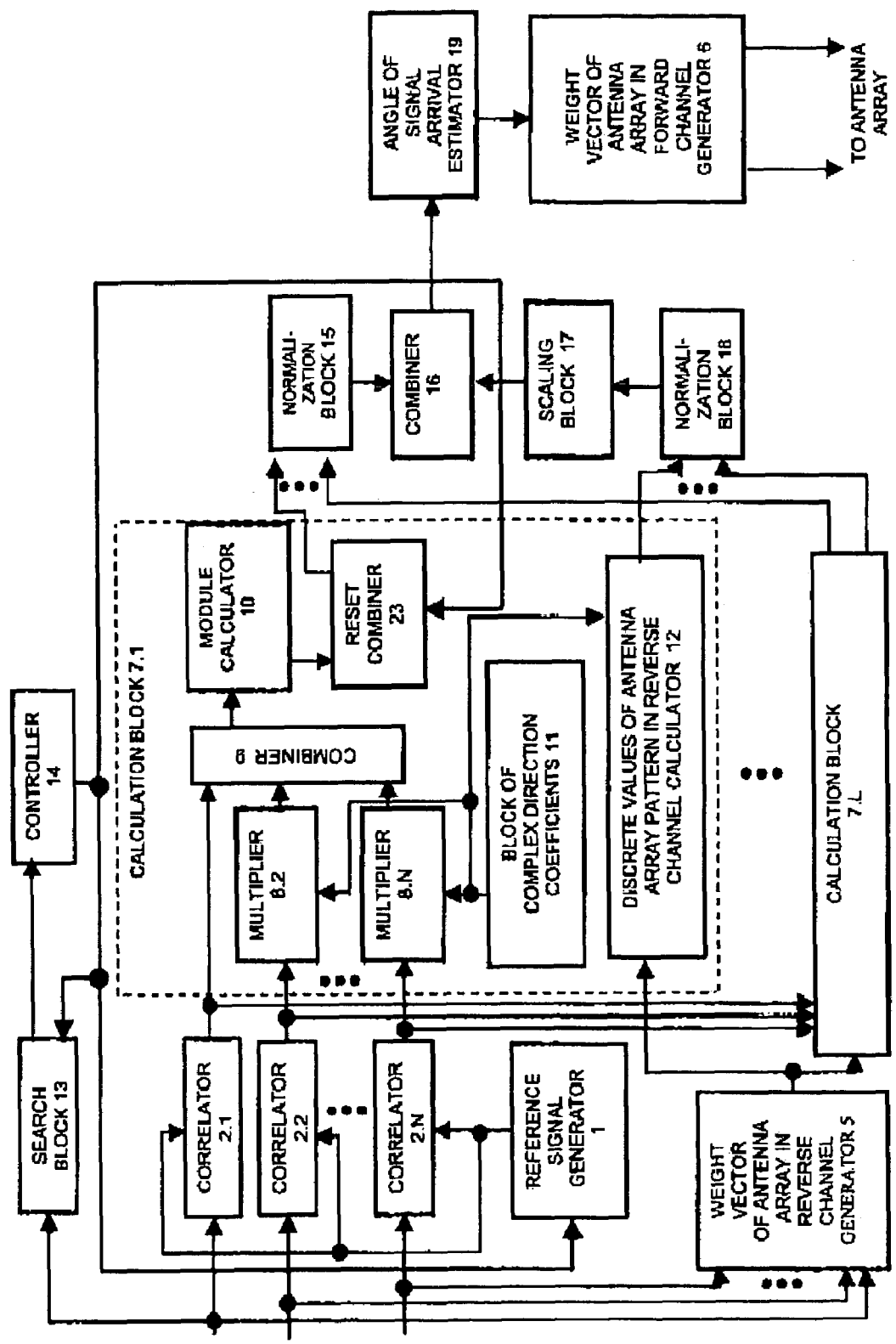
FIG. 13 is a block diagram of a second embodiment of the present invention.

For the realization of such a method the second embodiment that is illustrated in FIG. 13 is used.

As shown in FIG. 13, the proposed device contains N correlators 2.1-2.N, L decision function of the direction calculators 7.1-7.L, the first inputs of which are the inputs of the correlation responses of pilot signal of the antenna array elements and are connected to the outputs of the corresponding correlators 2.1-2.N, a search block 13, a controller 14, antenna array weight coefficients in the reverse channel generator 5, a first normalization block 15, a second combiner 16, angle of signal arrival estimator 19, antenna array weight coefficients in the forward channel generator 6, and also scaling block 17 and second normalization block 18. The first inputs of correlators 2.1-2.N are the input signals and are connected to the device inputs. The second inputs of correlators 2.1-2.N are reference signals and are connected to the reference output of reference signal generator 1. The input of reference signal generator 1 is connected to the output of controller 14 that provides the synchronous functioning of the device. The first search block 13 is connected to the input of the device, the second input of search block 13 is connected to the output of controller 14, and the output of search block 13 outputs the search decision function and is connected to the input of controller 14. Each decision function direction calculator 7.1-7.L, contains N−1 multipliers 8.2-8.N, first combiner 9, module calculator 10, complex direction coefficients 11, discrete values of the antenna array pattern in the reverse channel calculator 12, and reset combiner 23. First inputs of multipliers 8.2-8.N and first input of first combiner 9 are connected to outputs of correlators 2.1-2.N, outputs of multipliers 8.2-8.N are connected to the inputs of combiner 9, starting from the second and up to N. The output of combiner 9 is the complex correlation response of direction pilot signal at the output of the antenna array and is connected to the input of module calculator 10. The output of module calculator 10 is the module of direction pilot signal complex correlation response at the output of the antenna array and is connected to the first input of reset combiner 23, the second input of the reset combiner 23 which is a reset signal from controller 14. The output of reset controller 23 is the pilot signal combined correlation response at the output of the antenna array and the first output of each direction decision function calculation block 7.1-7.L, and is connected to the corresponding input of the first normalization 15.

The first input of discrete values of the antenna array pattern in the reverse channel calculator 12 is the second input of each block of calculation of decision function of direction 7.1-7.L and is connected to the output of weight vector of antenna array in the reverse channel generator 5 generating at its output weight coefficients of antenna array elements in the reverse channel. Signal inputs of weight vector of the antenna array in the reverse channel generator 5 are connected to the input of the device. The second input of discrete values of the antenna array pattern in the reverse channel generator 12 and second inputs of multipliers 8.2-8.N are connected to the output of complex direction coefficients 11, which outputs the complex coefficients for the given direction.

The output of discrete values of the antenna array pattern in the reverse channel calculator 12, which is the second output of decision function of direction calculators 7.1-7.L, and outputs values of antenna array pattern in the reverse channel, is connected to the corresponding input of second normalization block 18.

The output of first normalization block 15, which outputs normalized modules of decision function of all L directions, is connected to the first input of second combiner 16. The output of second normalization block 18 outputs the normalized values of the antenna array pattern in the reverse channel of all L directions and is connected to the input of scaling block 17. The output of scaling block 17 outputs the weighted normalized values of the antenna array pattern in the reverse channel for L directions and is connected to the second input of second combiner 16. The output of second combiner 16 is the values of decision function for L directions and is connected to the input of angle of signal arrival estimator 19, the output of which is the estimate of the average angle of signal arrival and is connected to the input of weight coefficients of antenna array in the forward channel generator 6. The output of weight coefficients of antenna array in the forward channel generator 6 is the output of amplitude and phase coefficients of antenna array elements.

The complex multipath signal supplied from outputs N of antenna array elements is fed to first (signal) inputs of correlators 2.1-2.N and outputs of weight coefficients in the reverse channel generator 5.

At the same time the complex multipath signal supplied from the first antenna array element is fed to the input of search block 13. Search block 13 generates the decision function of path signal search in discrete time positions. This information of search block 13 is sent to controller 14, which compares the obtained values of the decision function with the threshold and determines time positions of path signals by determining which values exceed the threshold. In controller 14 the obtained values of the decision function for detected path signals are compared between each other, and time position of the path signal with the maximum value of the decision function is determined.

From the control signal supplied from the output of controller 14, the reference signal corresponding to the path signal with the maximum power is fed from the output of reference signal generator 1, and to second inputs of correlators 2.1-2.N.

In correlators 2.1-2.N complex correlation responses of the pilot signal of antenna array elements $u_n$, $n=\overline{1,N}$ are generated on time intervals of J chip lengths.

The correlation responses of the pilot signal of antenna array elements are fed to first inputs of L decision function of direction calculators 7.1-7.L, namely to the first input of combiner 9, and to first inputs of corresponding (complex) multipliers 8.2-8.N. The number of L blocks of calculation of decision function 7.1-7.L is equal to the number of considered directions of the researched angular area.

In weight vector of in the reverse channel generator 5, the complex weight coefficients of adaptive antenna array elements in the reverse channel are generated during reception of the subscriber signal according to one of algorithms proposed, for example, in R. A. Monzingo, T. U. Miler. Adaptive antenna arrays. /M.: Radio and communication, 1986, p. 77-90. These coefficients are fed to second inputs of decision function of direction calculators 7.1-7.L, and namely to first inputs of discrete values of antenna array pattern in the reverse channel calculators 12.

Complex direction coefficients $\theta_i$ 11 contains complex coefficients $a_n(\theta_i)$, $n=\overline{1,N}$ for the i-th direction, $i=\overline{1,L}$. These coefficients are calculated, for example, according to the algorithm proposed in Joseph C., Liberti, Jr., Bellcore, and Theodore S. Rappaport, "Smart Antennas for Wireless Communications" Prentice Hall PRT, 1999, p. 86-88. Complex direction coefficients $a_n(\theta_i)$, $n=\overline{1,N}$ are fed to second inputs of corresponding (complex) multipliers 8.2-8.N and to second inputs of discrete values of antenna array pattern in the reverse channel calculator 12.

In this case according to Joseph C., Liberti, Jr. Bellcore Theodore S. Rappaport. Smart Antennas for Wireless Communications Prentice Hall PRT, 1999, pp. 86-88, complex coefficient $a_1(\theta_i)=1$, therefore the number of multipliers used in block of calculation of decision function of direction 7 is N−1.

In each multiplier 8.2-8.N corresponding complex correlation responses of the pilot signal of antenna array elements are multiplied by complex coefficients $a_n(\theta_i)$, $n=\overline{1,N}$ of each direction.

Output signals of multipliers 8.2-8.N and complex correlation responses of the pilot signal of the first antenna array element supplied from the output of first correlator 2.1 are fed to inputs of combiner 9 where they are combined. A signal supplied from the output of combiner 9 corresponds to the complex correlation response of the pilot signal at the output of the antenna array for $\theta_i$ direction.

This signal is fed to the input of module calculator 10 where the square root of the sum of squares of the real and imaginary part of the signal is calculated. The output signal of module calculator 10 is equal to the module of complex correlation response of the pilot signal at the output of antenna array for $\theta_i$ direction. This signal is supplied from the output of module calculator 10 to the first input of reset combiner 23, to the second input of which the control reset signal is supplied from controller 14.

From the control reset signal in reset combiner 23 the non-coherent accumulation (combining) of M modules of complex correlation responses of the pilot signal at the output of the antenna array for $\theta_i$ direction is performed.

The number of M non-coherent components is set either constant or selected adaptively depending in the signal fading frequency so that the full duration of the non-coherent accumulation is determined for several fading periods.

A signal supplied from the output of reset combiner 23 of each decision function of direction calculator 7.1-7.L is the combined correlation response of the pilot signal at the output of the antenna array $Z(\theta_i)$ of $\theta_i$ direction, and is fed to the corresponding to input of normalization block 15. In normalization block 15 for L different directions the maximum combined correlation response of the pilot signal is determined at the output of antenna array by comparing the combined correlation responses of the pilot signal at the output of antenna array $Z(\theta_i)$ of different directions, and the normalized combined correlation responses of the pilot signal at the output of the antenna array are generated for L different directions. The normalization is performed by determining ratios of combined correlation responses of the pilot signal at the output of antenna array for L different directions, and the maximum combined correlation response. The obtained normalized signals for L different directions are fed to first inputs of combiner 16.

In discrete values of antenna array pattern in the reverse channel calculator 12 for each of L different directions $\theta_i$, $i=\overline{1,L}$ of the researched angular area, the values of the antenna array pattern in the reverse channel are generated according, "Smart Antennas for Wireless Communications", as indicated above, and which are transmitted to inputs of normalization block 18.

In normalization block 18 for L different directions the maximum value of the antenna array pattern in the reverse channel is determined by comparing values of the antenna array pattern in the reverse channel of different directions with each other, and normalized values of the antenna array pattern in the reverse channel are generated for L different directions. The normalization is performed by determining the ratio of values of the antenna array pattern in the reverse channel for L different directions to the maximum value. The obtained normalized values of the antenna array pattern in the reverse channel for L different directions are fed to the input of scaling block 17. Scaling block 17 generates the weighted values of the normalized antenna array pattern in the reverse channel for L different directions by multiplying values of the normalized antenna array pattern by $\alpha$ weight coefficient that is fed to the second input of combiner 16. The decision function is generated at the output of combiner 16 for L different directions $\theta_i$, $i=\overline{1,L}$ of the researched angular area performing the combining of normalized combined correlation responses of the pilot signal at the output of antenna array and weighted values of the antenna array pattern in the reverse channel. The signal of the decision function is sent to angle of signal arrival estimator 19, in which the maximum value of the decision function is determined by comparing values of the decision function for L different directions $\theta_i$, $i=\overline{1,L}$ of the researched angular area to each other. The searched estimate $\hat{\theta}$ of the average angle of signal arrival in the reverse channel is determined by the position of direction of the decision function maximum.

Estimate $\hat{\theta}$ of the average angle of signal arrival in the reverse channel is fed to the input of weight vector of the antenna array in the forward channel generator 6, in which, for example, according to the algorithm discussed above, phase coefficients of antenna array elements are determined using the generated estimate of the average angle of arrival of the signal taking into account the geometry of the antenna array. Amplitude coefficients of antenna array elements are set equal to each other. Finally the complex weight coefficient vector of the antenna array in the forward channel, for example, for the half-wave equidistant antenna array is determined as follows:

$$w=\{\exp[j\pi(n-1)\cos\hat{\theta}]\}, n=\overline{1,N}, \qquad (29)$$

where $\hat{\theta}$ is an estimate of the average angle of signal arrival in the reverse channel.

The obtained complex weight coefficients of antenna array elements are utilized to transmit the signal to the subscriber in the forward channel.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for forming a forward channel pattern in a base station of a communication system equipped with an antenna array, comprising the steps of:

generating complex correlation responses to a signal received by the antenna array in association with L different directions, respectively;

calculating discrete values of an antenna pattern in a reverse channel in association with the L different directions, respectively;

combining the generated complex correlation responses with the discrete values of an antenna pattern associated therewith, thereby generating decision functions associated with the L different directions, respectively;

estimating, in association with the L different directions, angles of signal arrival at each of which an associated one of the generated decision functions has a maximum value;

determining phase coefficients of elements of the antenna array, based on the estimated angles of signal arrival, respectively;

estimating respective averages of the estimated signal angles by estimating top and bottom boundaries of angle signal areas for respective averaged estimate distribution vectors of the estimated signal arrival angles so that the average angles are used for the determination of the phase coefficients; and generating weight vectors of the antenna array in a forward channel using the determined phase coefficients.

2. The method of claim 1, wherein the received signal is a pilot signal.

3. The method of claim 1, wherein the step of generating the complex correlation responses comprises the steps of:

generating complex correlation pilot signal responses to a pilot signal received through one of elements of the antenna array;

multiplying the generated pilot signal responses by complex direction coefficients predetermined for the antenna array elements in association with the L different directions, respectively; and combining the results of the multiplication, thereby generating the complex correlation responses respectively associated with the L different directions.

4. The method of claim 3, further comprising the step of non-coherently accumulating the complex correlation response associated with each of the L different directions by a predetermined number.

5. The method of claim 3, further comprising the step of normalizing the complex correlation response associated with each of the L different directions.

6. The method of claim 1, wherein the step of calculating the discrete values of the antenna pattern comprises the steps of:

generating complex weight coefficients for elements of the antenna array in the reverse channel; and calculating the discrete values of the antenna pattern, based on the generated complex weight coefficients and complex direction coefficients respectively predetermined for the antenna array elements, in association with the L different directions, respectively.

7. The method of claim 6, further comprising the steps of:

normalizing the discrete values of the antenna pattern respectively associated with the L different directions; and scaling the normalized discrete values of the antenna pattern by multiplying the normalized discrete values of the antenna pattern by a predetermined weight coefficient.

8. The method of claim 1, wherein the step of determining the phase coefficients comprises the steps of:

determining the phase coefficients based on the estimated average signal arrival angles, respectively, while taking into consideration a geometry of the antenna array;

forming a correlation matrix of the antenna array elements based on the estimated top and bottom boundaries of the angle signal areas;

obtaining a bottom triangular matrix from the formed correlation matrix; and determining amplitude coefficients of the antenna array elements based on the obtained bottom triangular matrix and the determined phase coefficients.

9. The method of claim 8, wherein a ratio of the amplitude coefficient of the antenna array element transmitting a pilot signal to the amplitude coefficient of each of the remaining antenna array elements is 1:μ;

where μ is a maximum value of an average power ratio between coherent and non-coherent components of the received signal, the value being not more than a predetermined value.

10. An apparatus for forming a forward channel pattern in a base station of a communication system equipped with an antenna array, comprising:

a calculation block for generating complex correlation responses to a signal received by the antenna array in association with L different directions, respectively, and calculating discrete values of a antenna pattern in a reverse channel;

a combiner for combining the generated complex correlation responses with the discrete values of the antenna pattern associated therewith, thereby generating decision functions associated with the L different directions, respectively;

a block for estimating, in association with the L different directions, the angles of signal arrival at each of which an associated one of the generated decision functions has a maximum value, respectively;

a weight vector generator for determining phase coefficients of elements of the antenna array, based on the estimated angles of signal arrival, respectively, and generating weight vectors of the antenna array in a forward channel, based on the, phase coefficients; and a block for estimating respective averages of the estimated signal arrival angles by estimating top and bottom boundaries of angle signal areas for respective averaged estimate distribution vectors of the estimated signal arrival angles so that the average angles are used for the determination of the phase coefficients.

11. The apparatus of claim 10, wherein the received signal is a pilot signal.

12. The apparatus of claim 11, wherein the calculation block comprises:

multipliers for multiplying complex correlation pilot signal responses to the pilot signal received through one of elements of the antenna array by complex direction coefficients predetermined for the antenna array elements, in association with the L different directions, respectively;

a combiner for combining the results of the multiplication, thereby generating the complex correlation responses respectively associated with the L different directions; and a block for receiving respective complex weight coefficients for the antenna array elements in the reverse channel and complex direction coefficients respectively predetermined for the antenna array elements, in association with the L different directions, thereby calculating the discrete values of the antenna pattern, respectively.

13. The apparatus of claim 12, further comprising:
correlators for generating the complex correlation pilot signal responses to the received pilot signal; and
a block for generating the complex weight coefficients for the antenna array elements in the reverse channel.

14. The apparatus of claim 12, further comprising:
a reset combiner for non-coherently accumulating the complex correlation response associated with each of the L different directions by a predetermined number by resetting an output of the complex correlation response generating combiner.

15. The apparatus of claim 13, further comprising a normalization block for normalizing the complex correlation pilot signal response associated with each of the L different directions.

16. The apparatus of claim 13, further comprising:
a normalization block for normalizing the discrete values of the antenna pattern respectively associated with the L different directions; and
a scaling block for scaling the normalized discrete values of the antenna pattern by multiplying the normalized discrete values of the antenna pattern by a predetermined weight coefficient.

17. The apparatus of claim 10, wherein the weight vector generator:
determines the phase coefficients based on the estimated average signal arrival angles, respectively, while taking into consideration a geometry of the antenna array;
forms a correlation matrix of the antenna array elements based on the estimated top and bottom boundaries of the angle signal areas;
obtains a bottom triangular matrix from the formed correlation matrix; and
determines the amplitude coefficients of the antenna array elements based on the obtained bottom triangular matrix and the determined phase coefficients.

18. The apparatus of claim 17, wherein a ratio of the amplitude coefficient of the antenna array element transmitting a pilot signal to the amplitude coefficient of each of the remaining antenna array elements is 1:$\mu$;
where $\mu$ is a maximum value of an average power ratio between coherent and non-coherent components of the received signal, the value being not more than a predetermined value.

* * * * *